United States Patent [19]

Halioua

[11] Patent Number: 4,657,394
[45] Date of Patent: Apr. 14, 1987

[54] APPARATUS AND METHOD FOR OBTAINING THREE DIMENSIONAL SURFACE CONTOURS

[75] Inventor: Maurice Halioua, Sea Cliff, N.Y.

[73] Assignee: New York Institute of Technology, Old Westbury, N.Y.

[21] Appl. No.: 753,722

[22] Filed: Jul. 10, 1985

Related U.S. Application Data

[63] Continuation-in-part of Ser. No. 650,824, Sep. 14, 1984.

[51] Int. Cl.⁴ .............................................. G01B 11/24
[52] U.S. Cl. ................................ 356/376; 250/237 G
[58] Field of Search ................. 356/1, 2, 375, 376; 250/237 G

[56] References Cited

U.S. PATENT DOCUMENTS

| | | | |
|---|---|---|---|
| 3,627,427 | 12/1971 | Johnson et al. | 356/376 |
| 3,879,133 | 4/1975 | Mathieu. | |
| 4,188,124 | 2/1980 | Jaerisch et al. | 356/356 |
| 4,191,476 | 3/1980 | Pollard | 356/349 |
| 4,212,073 | 7/1980 | Balasubramanian | 356/376 X |
| 4,349,277 | 9/1982 | Mundy et al. | 356/376 |
| 4,373,804 | 2/1983 | Pryor et al. | 356/1 |

FOREIGN PATENT DOCUMENTS 2512945  3/1983  France .

OTHER PUBLICATIONS

Cline et al., *Applied Optics*, vol. 21, No. 24, Dec. 15, 1982, pp. 4481–4488.

*Primary Examiner*—F. L. Evans
*Attorney, Agent, or Firm*—Martin Novack

[57] ABSTRACT

Phase measurements of deformed grating images are used in performing improved optical profilometry. Individual line profiles are obtained at a series of rotational increments of a body. A full 360 degree surfce profile, or a portion thereof, can then be generated.

27 Claims, 26 Drawing Figures

APPARATUS AND METHOD FOR OBTAINING THREE DIMENSIONAL SURFACE CONTOURS

This is a continuation-in-part of copending U.S. patent application Ser. No. 650,824, filed Sept. 14, 1984.

BACKGROUND OF THE INVENTION

This invention relates to the determination of the surface contours of objects and, more particularly, to an improved apparatus and method for determining three dimensional surface profiles of objects, including 360 degree renditions thereof.

Surface profile measurement by non-contact optical methods has been extensively studied because of its importance in fields such as automated manufacturing, component quality control, medicine, robotics, and solid modeling applications. In most of these methods a known periodic pattern, such as a grating, is projected on the surface to be measured and the image of the grating, deformed by the surface, is analyzed to determine the profile. "Demodulation" of the deformed grating by means of a matched reference grating results in the well known Moire fringe patterns, which are easily interpretable as surface contours by a human observer, but, are somewhat more complicated for computer analysis. (See, for example, D. M. Meadows, W. O. Johnson and J. B. Allen, Appl. Opt. 9, 942 (1970); H. Takasaki, Appl. Opt. 9, 1467 (1970); P. Benoit, E. Mathieu, J. Hormiere and A. Thomas, Nouv. Rev. Opt. 6, 67 (1975); T. Yatagai, M. Idesawa and S. Saito, Proc. Soc. Photo-Opt. Instrum. Eng. 361, 81 (1982)). Improvements to the Moire method, aimed at increasing accuracy and at automating the measurements have been based, for example, on phase modulation. (See G. Indebetouw, Appl. Opt. 17, 2930 (1978), D. T. Moore and B. E. Truax, Appl. Opt. 18, 91 (1979).

An alternative approach to Moire is by an analysis of the deformed grating itself without the use of a physical or virtual reference grating. Direct methods based on geometrical analysis of the deformed grating requiring fringe peak determination are computationally complex, slow, and result in low accuracy. Another direct method, based on the use of a Fast Fourier Transform analysis of the deformed grating, has been demonstrated to be more suitable for automated profilometry (see, for example, M. Takeda and K. Mutoh, Appl. Opt. 22, 3977 (1983)). Limitations on measurement of steep object slopes and step discontinuities, the need for high resolution imaging systems and the need for powerful computing capability are some of the disadvantages of the Fast Fourier Transform method.

An approach to obtaining a complete 360 degree view of a general three-dimensional object, which has been the subject of intense activity, especially in computer vision research, is the reconstruction of three-dimensional shapes from several objects views, as seen from different points of observation. It generally involves the use of elaborate computer algorithms to 'match' these views in order to unify the images to determine the complete object shape. [See, for example, B. Bhanu, "Representation and Shape Matching of 3-D Objects", IEEE Trans. Anal. Machine Intell. PAMI-6, 340 (1984).] Such a digital image processing approach is computation intensive and generally offers limited accuracy.

Another approach involves the use of the shadow moire method in conjunction with a periphery camera. It tends to be mechanically cumbersome and to require tedious processing of fringe patterns recorded on film. [See, for example, C. G. Saunders, "Replication from 360-degree Moire Sensing", in 'Moire Topography and Spinal Deformity', M. S. Moreland, et al., EDS., Pergamon Press, New York, (1981), p. 76.]

In the parent application hereof, and as described in an article entitled "Automated Phase-Measuring Profilimetry of 3-D Diffuse Objects" by V. Srinivasan, H. C. Liu, and M. Halioua, Applied Optics, Vol. 23, No. 18, Sept. 15, 1984, there is disclosed a technique which employed, inter alia, phase measuring techniques that were used in classical interferometry, but were found to be particularly advantageous for use in deformed grating profilometry. When a sinusoidal intensity distribution is projected on a three dimensional diffuse surface, the mathematical representation of the deformed grating image intensity distribution is similar to that encountered in conventional optical interferometry. The surface height distribution can be translated to a phase distribution, and the accuracy which is characteristic of phase modulation interferometry, was used to advantage. [See, for example, J. H. Bruning, D. R. Herriott, J. E. Gallagher, D. P. Rosenfeld, A. D. White and D. J. Brangaccio, Appl. Opt. 13, 2696 (1974); J. C. Wyant, Appl. Opt. 14, 2622 (1975) for background.] It was noted that by using several phase modulated frames of deformed grating image data, a high degree of precision in the phase measurement can be achieved. By analogy with phase-measuring interferometry, where phase values can be measured with a resolution of 1/1000 of a fringe period (versus 1/30 for conventional single frame interferometry), surface profile measurements with less than 10 micron resolution were noted to be possible by the use of an optical system with a projected grating pitch in the millimeter range.

In accordance with an embodiment of the method in the parent application hereof and in the referenced Srinivasan, Liu and Halioua article, a technique was set forth for determining the surface profile of a three-dimensional object. In the method, an incident beam of light, having a sinusoidally varying intensity pattern, is directed at the object. The phase of the sinusoidal pattern of the incident beam is modulated. A deformed grating image of the object is received, at a detector array, for a number of different modulated phases of the input beam. The height of each point (i.e., elemental region) of the surface of the object is then determined with respect to a reference plane, each such height determination including the combining of the image intensity values at a detector position corresponding to a respective point of the object.

Among the advantages of the technique are the following: relatively simple optical hardware; relatively low frequency grating and low density detector array; full frame data capture and relatively simple processing.

It is an object of the present invention to provide further improvement, and a technique which is applicable to efficient and automatic obtainment of a three dimensional surface profile of an object, including the capability of obtaining a complete 360 degree surface profile.

SUMMARY OF THE INVENTION

In accordance with the improvements of the present invention, a complete 360 degree, or portion thereof, surface contour of an object can be obtained efficiently and with relatively inexpensive equipment, and without undue processing complexity, undue data acquisition and storage requirements, etc.

In accordance with an embodiment of the method of the invention, there is provided a technique for determining a three-dimensional surface profile of an object. An incident beam of light is directed at the object, the beam having a sinusoidally varying intensity pattern. The phase of the sinusoidal intensity pattern is modulated, such as by moving of a grating used to obtain the sinusoidally varying intensity pattern. A deformed grating image of a line profile of the object is detected, preferably at a linear detector; i.e., a detector having individual detector elements arranged in a line. For points on the line profile of the object, the distance of each such point from a reference line is then determined, each such distance determination including the step of combining intensity values of the received image at the different modulated phases to obtain an object phase for each point. In this manner, the coordinate locations of the points on a line profile of the object can be determined. [In the preferred embodiment, deformed grating images of the reference line are also obtained and used to obtain a reference phase for each point on the reference line, the reference phases then being used in the distance determinations of the object line profile coordinates with respect to the reference line.] The object is then rotated by a rotational increment, and the above steps are repeated to obtain the distances from the reference line of the object points on the next line profile. This procedure can then be repeated, as the object is rotated by further rotational increments, to obtain the distance information (and coordinate information, if desired) for line profiles covering a full 360 degrees of rotation of the object. As will be described, the data can be obtained in various procedural orders.

The technique hereof has several advantages compared with other methods of 360-degree shape reconstruction. In addition the the relative simplicity in setup and computation, the invention does not involve any complex view-matching operations and is characterized by high measuring accuracy. The invention also lends itself more readily to complete automation without the need for major host system support. The main trade-off is a relatively low data acquisition rate, so the invention is preferably used for obtaining surface contours of stationary, rigid objects.

Further features and advantages of the invention will become more readily apparent from the following detailed description when taken in conjunction with the accompanying drawings.

DESCRIPTION OF THE PREFERRED EMBODIMENT

Figure 1:
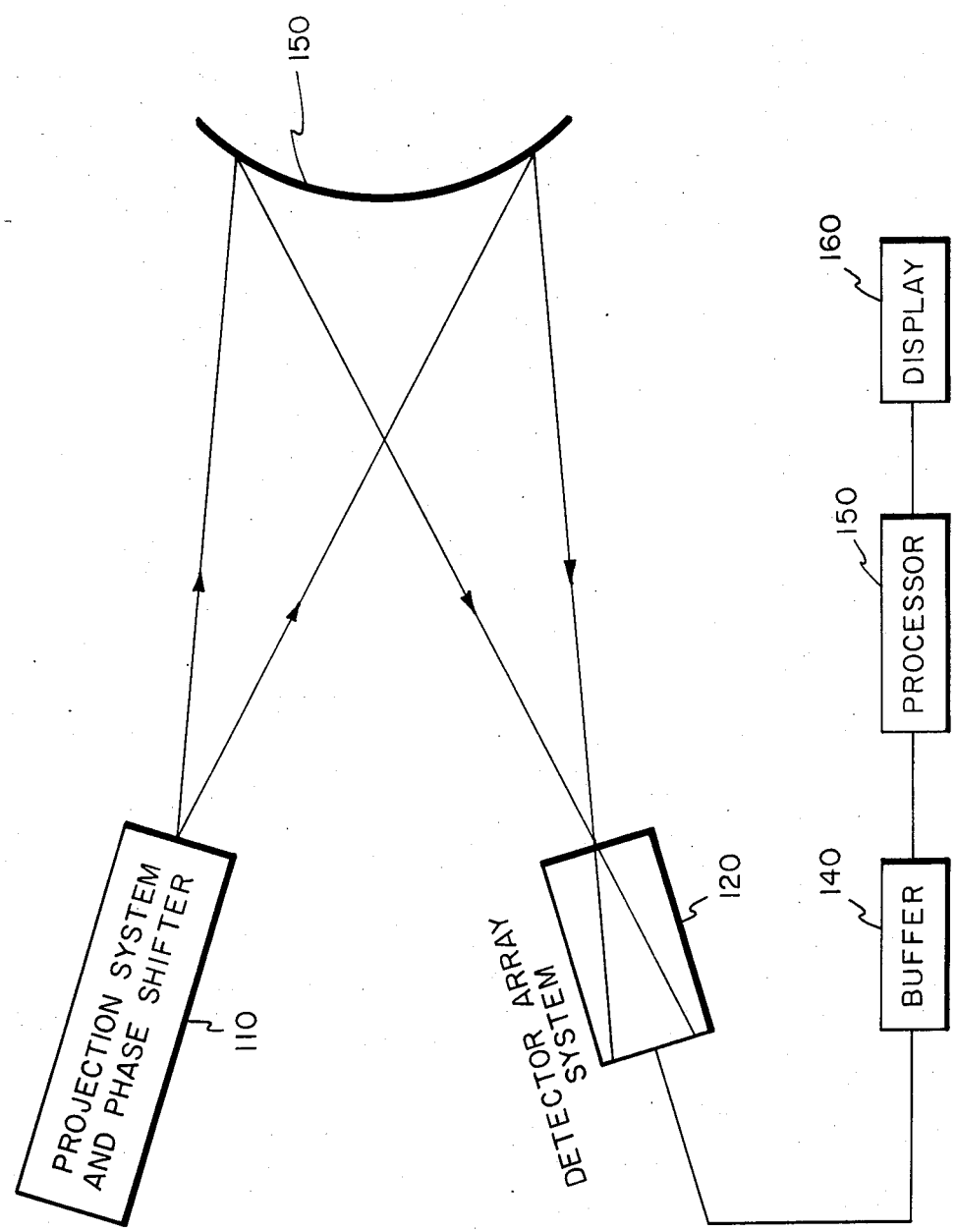
FIG. 1 is a block diagram, partially in schematic form, of an apparatus as set forth in the above-referenced parent application hereof.

Referring to FIG. 1, there is shown a block diagram of an apparatus as set forth in the above-referenced parent application hereof. A sinusoidal grating projection system and phase shifter 110 is provided, and projects an optical beam at a three dimensional object 150. The reflected beam is received by a detector array system 120 which, in the illustrated embodiment detects frames of data which are stored in buffer 140 and processed by processor 150. The processor 150 may be, for example, any suitable analog or digital computer, processor, or microprocessor and conventional associated memory and peripherals, programmed consistent with the teachings hereof. In the experiments described hereinbelow, a model LSI 11/23, made by Digital Equipment Corp., was utilized. The processed information can be displayed on a display device 160.

Figure 2:
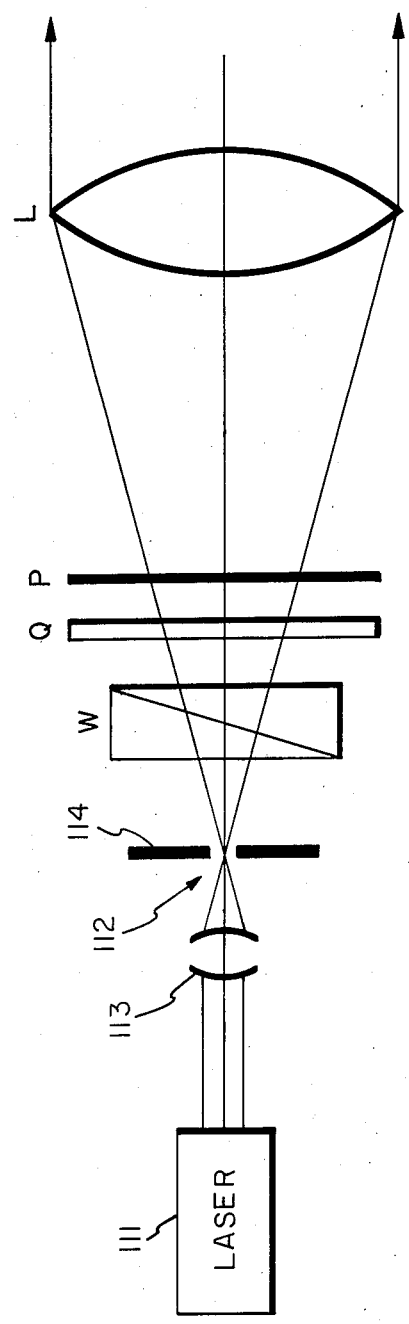
FIG. 2 is a schematic diagram of an embodiment of a projection and phase shifting system as used in the FIG. 1 embodiment.

A sinusoidal intensity distribution can be projected on the surface to be profiled, e.g. by generating an interference pattern between two coherent plane wavefronts or by projecting an image of a grating with sinusoidal transmission function distribution illuminated by an incoherent light source. FIG. 2 illustrates an embodiment of the projection system and phase shifter 110 (of FIG. 1), which comprises a laser illuminated shearing polarization interferometer. The linearly polarized output beam from the laser 111 is spatially filtered by filer 112, which includes lens 113 and pinhole 114, and then sheared by a Wollaston prism W. The phase modulator includes a combination of a quarter wave plate Q and a rotatable polarized P. By rotating the polarizer, the sinusoidal intensity distribution of the interference pattern can be modulated. A 180° rotation of the polarizer corresponds to a $2\pi$ phase modulation and this permits precise phase shifts. It will be understood that other types of phase shifters, for example polarization dependent phase shifters such as electro-optic modulators, may also be used in this system. The fringe period can also be easily changed by an axial translation of the Wollaston prism W. A collimating lens L is used to conserve light and simplify the optical geometry.

Figure 3:
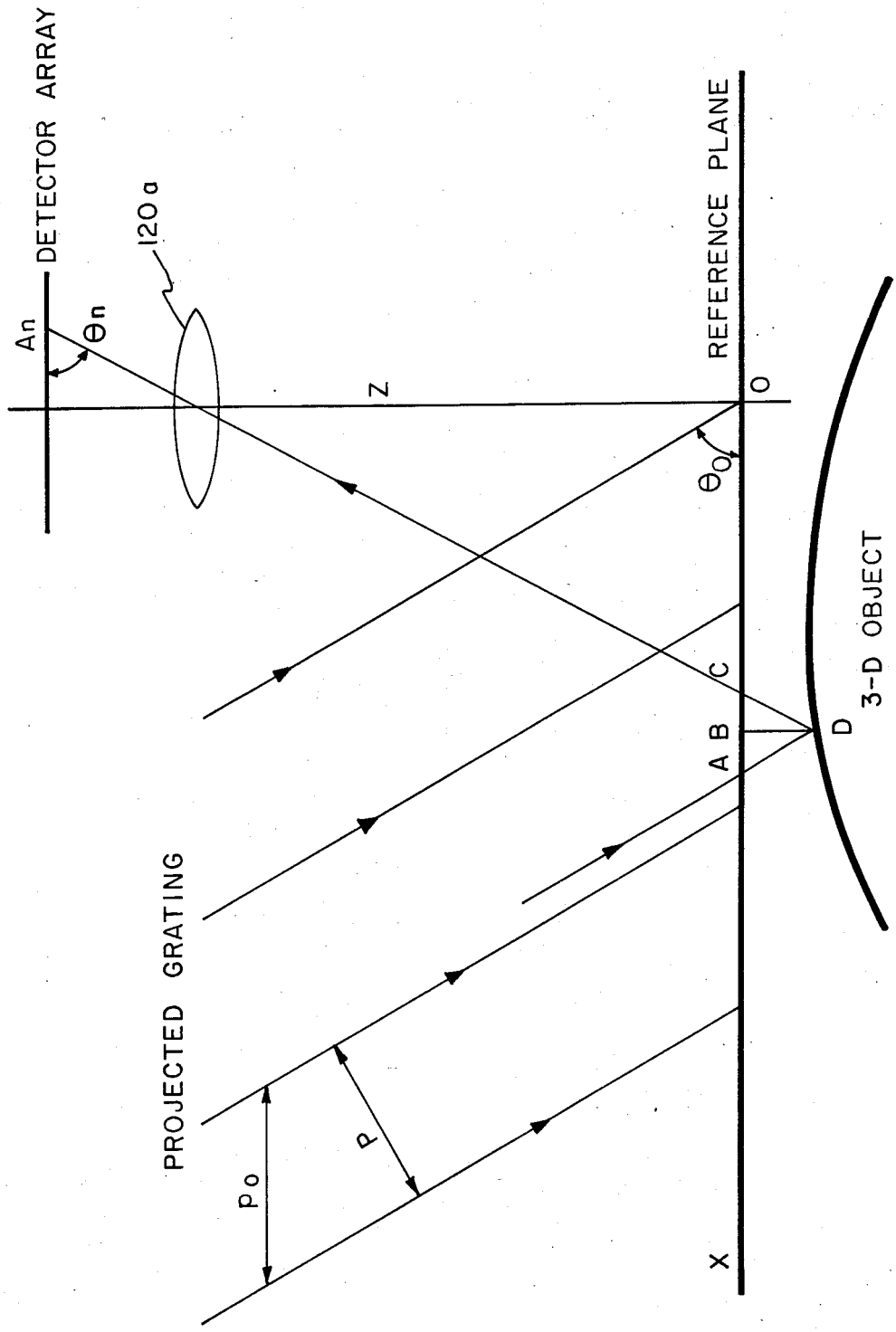
FIG. 3 illustrates the optical geometry of a form of the FIG. 1 embodiment, as used for an analysis of operation.

Before further describing operation of the apparatus of this embodiment, consider the diagram of FIG. 3 in which the height h(x,y) of object 150 is to be measured relative to the indicated reference plane. The projected sinusoidal interferometric pattern has a period $p_o$ as seen on the reference plane, and the intensity that it produces at a point, such as C on the reference plane, is $$I = a(x,y) + b(x,y) \cos (2\pi OC/p_o) \tag{1}$$

where a(x,y) is the background or DC light level, b(x,y) is the fringe contrast and O, the intersection of the imaging optical axis with the reference plane is assumed, for convenience, to coincide with an intensity maximum of the projected pattern. The argument $\phi_R = 2\pi OC/p$ of the cosine function in Eq. (1) is defined as the "phase" at C and it effectively measures the geometric distance OC, if O is taken at the reference point where the phase is zero. $A_n$ is one of the detectors in the array, located at the image plane and is used to measure the intensity at C on the reference plane and at D on the object. An imaging lens 120a, of the detection system 120, is shown in the FIG. 3 diagram. The intensity observed at D is the same as that which would have been observed at A on the reference plane, modified by the object reflectivity r(x,y), that is $$I_D = r(x,y)[a(x,y) + b(x,y) \cos (2\pi OA/p_o)] \tag{2}$$

The difference $\Delta\phi_{CD}$ in phase values for the points C and D, observed by the same detector $A_n$, can be related to the geometric distance AC as follows:

$$AC = (p_o/2\pi) \cdot \Delta\phi_{CD} \tag{3}$$

AC is related to the surface height BD as follows:

$$BD = AC \tan \theta_o / (1 + \tan \theta_o / \tan \theta_n) \tag{4}$$

where the angles $\theta_o$ and $\theta_n$ are as shown in FIG. 3. Assuming that $\theta_n$ is nearly 90°, as is the case for any practical system with a large demagnification factor, the relationship (4) can be simplified to:

$$BD = AC \tan \theta_o \tag{5}$$

From Eqs. (3) and (5), the effective wavelength of the system is defined as $\lambda_e = p_o \tan \theta_o$.

To measure the phase of the intensity variation represented by either Eq. (1) of Eq. (2), the projected pattern can be phase modulated by rotating the polarizer P (FIG. 2). In the case of Eq. (1), let $$\phi_R = 2\pi OC/p_o = 2\pi m + \phi_R' \tag{6}$$

where $\phi_R'$ is the phase angle reduced to the range $0-2\pi$ and m is an integer. If $\phi_M$ represents the phase modulation, then from Eq. (1), $$I_c = a(x,y) + b(x,y) \cos (\phi_M + \phi_R') \tag{7}$$

N measurements $I_1, I_2, \ldots I_N$ of $I_c$ are made with a phase increment of $2\pi/N$ following each measurement. From these measurements, one obtains, $$\tan \phi_R' = \sum_1^N I_n \sin(2\pi n/N) / \sum_1^N I_n \cos(2\pi n/N) \tag{8}$$

[See J. H. Bruning, D. R. Herriott, J. E. Gallagher, D. P. Rosenfeld, A. D. White and D. J. Brangaccio, Appl. Opt. 13, 2693 (1974).] By recording N frames of intensity data, the phase seen by each detector in the array can be computed, both for the reference plane and the object surface. Based on the continuity of the phase function, starting from a reference location with zero phase, the integer m of Eq. (6) can also be determined by monitoring the computed phases between two adjacent detectors and identifying sharp phase discontinuities which result from the $2\pi$ transitions. Eqs. (3) and (5) can then be used to compute the surface profile, as is further described below.

Figure 4A:
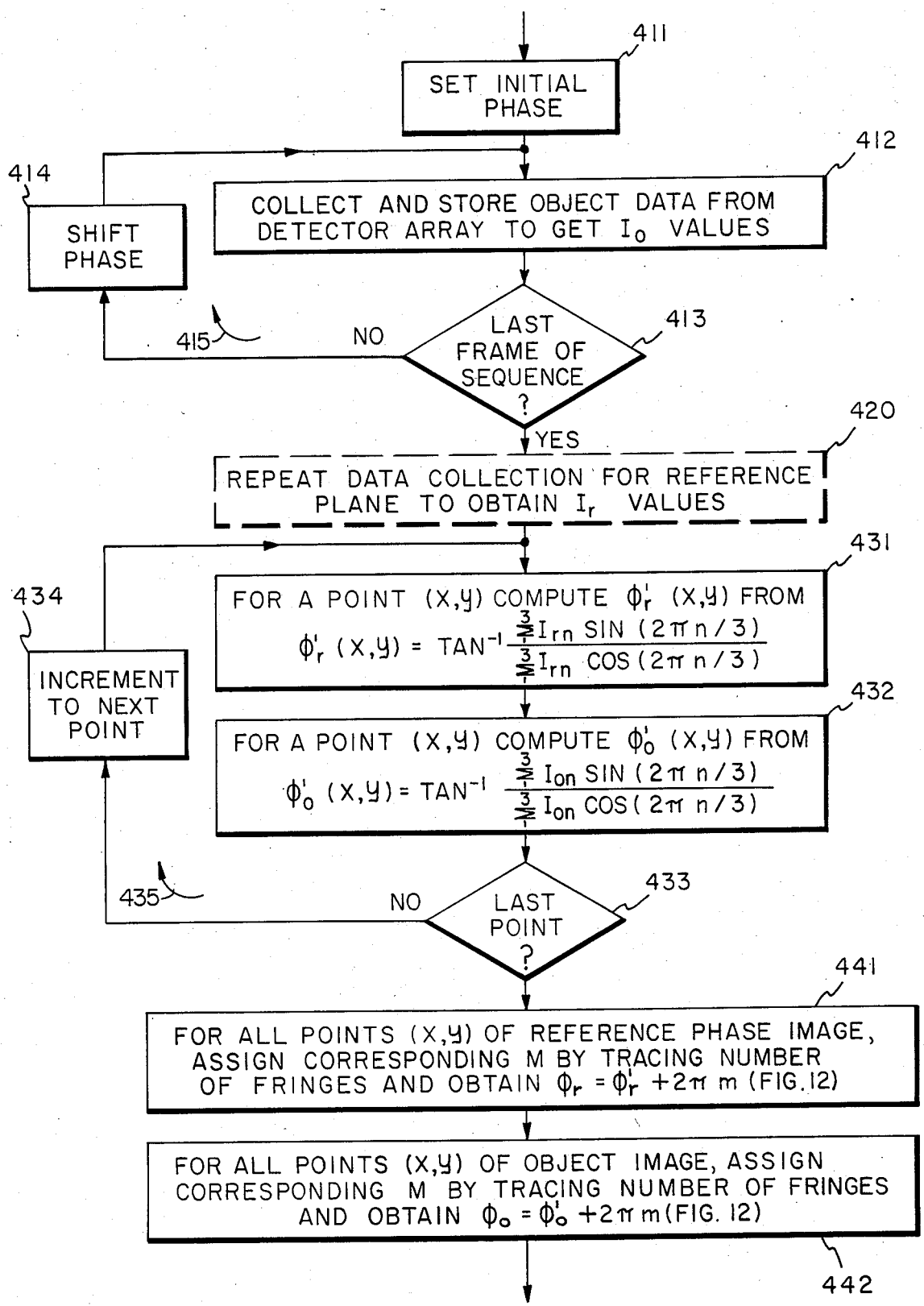
FIG. 4, which includes FIGS. 4A and 4B placed one below another, is a flow diagram of a routine for programming the processor of the FIG. 1 embodiment.
Figure 4B:
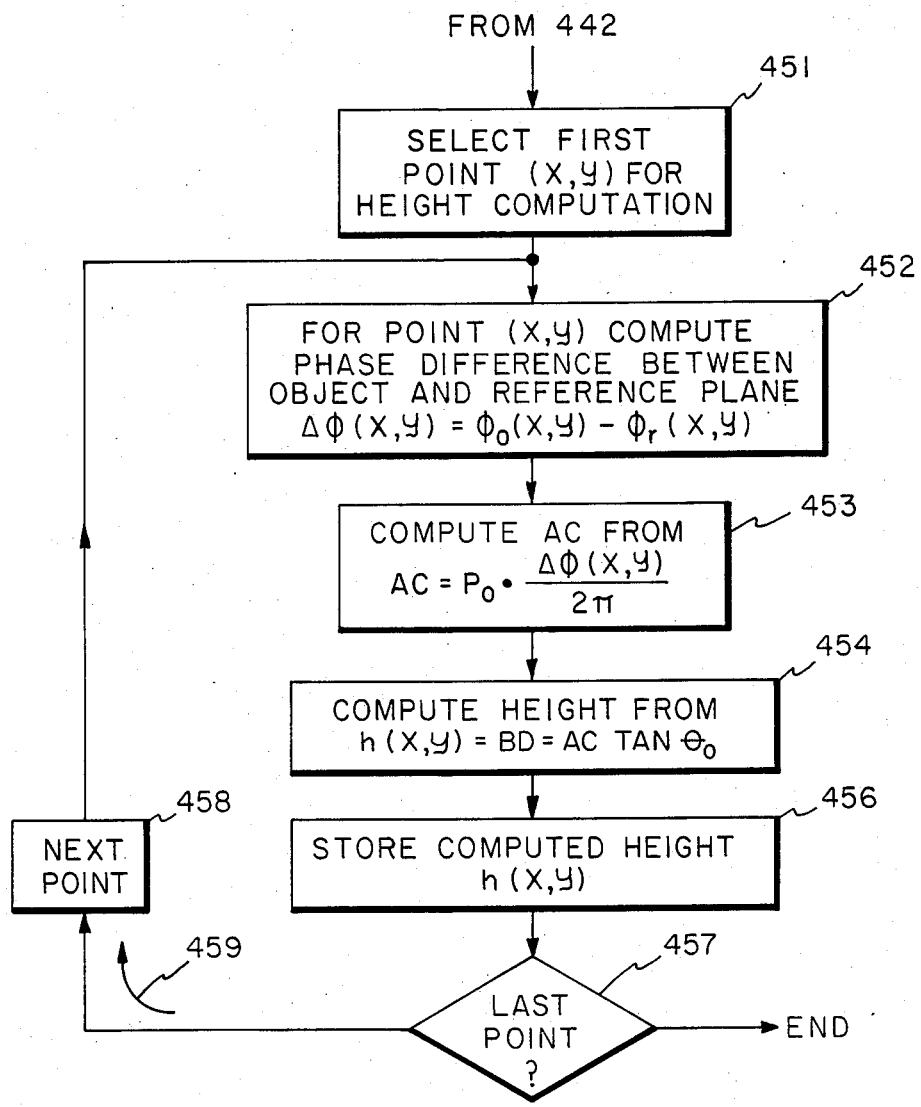

Referring to FIG. 4, there is shown a flow diagram of a routine for programming the processor 150 of FIG. 1 in accordance with a form of the described first embodiment. The block 411 represents the setting of the initial phase of the incident beam of sinusoidally varying intensity; e.g., for example, to a reference phase designated as zero degrees. A frame of data (intensity information) is then collected and stored from the detector array to get a first set of intensity values for the object designated as $I_{o1}(x,y)$ values. A determination is then made (diamond 413) as to whether or not the last frame of the sequence has been collected and stored. If not, the block 414 is entered, this block representing the shifting of the phase of the incident beam, such as by rotating the polarizer (FIG. 2). In the present embodiment, three frames are used in the sequence, so there are two phase shifts of 120 degrees each. It will be understood that the phase shifting can be implemented automatically under computer control, semi-automatically, or manually, as desired. Accordingly, at the completion of the loop 415, three frames of intensity values for the object, $I_{on}(x,y)$ are obtained, as follows:

$$I_{o1} = a + b \cos (\phi_m + \phi_o'(x,y))$$

$$I_{o2} = a + b \cos (\phi_m + \phi_o'(x,y) + 2\pi/3)$$

$$I_{o3} = a + b \cos (\phi_m + \phi_o'(x,y) + 4\pi/3)$$

The procedure of loop 415 is then repeated for the reference plane, as represented by the block 420. This data can be obtained, for example, by placing a white reflective reference plane adjacent the object, as illustrated in FIG. 3, and following the procedure just described to obtain frames of reference intensity values $I_{rn}(x,y)$ as follows:

$$I_{r1} = a + b \cos (\phi_m + \phi_r'(x,y))$$

$$I_{r2} = a + b \cos (\phi_m + \phi_r'(x,y) 2\pi/3)$$

$$I_{r3} = a + b \cos(\phi_m + \phi_r'(x,y) 4\pi/3)$$

It will be understood that the data could alternatively be taken in any desired sequence, such as by interposing the reference plane before each phase shift so as to obtain both the object and reference intensity information at each incident beam phase, although this is not preferred. Also, it will be understood that the reference phase information can be computed without taking measured reference data (from the known characteristics of the incident beam and the known system geometry), but it is preferable, when possible, to obtain the reference data from an actual reference plane so as to minimize the effects of distortions in the system, etc.

Next, for a point (x,y) the reference plane phase $\phi_r'(x,y)$ at the point can be computed, using (8) above, from the three reference plane intensities as:

$$\phi_r'(x,y) = \tan^{-1} \frac{\sum_1^3 I_{rn} \sin(2\pi n/3)}{\sum_1^3 I_{rn} \cos(2\pi n/3)}$$

as represented by the block 431. The block 432 is then entered, this block represented the computation, for point (x,y) of the object phase from the three object intensity measurements as:

$$\phi_o'(x,y) = \tan^{-1} \frac{\sum_1^3 I_{on} \sin(2\pi n/3)}{\sum_1^3 I_{on} \cos(2\pi n/3)}$$

A determination is made as to whether or not the last point has been processed (diamond 433), and, if not, the processor increments to the next point (block 434), and the loop 435 continues until the reference and object phases have been computed for all desired points (x,y).

Figure 12:
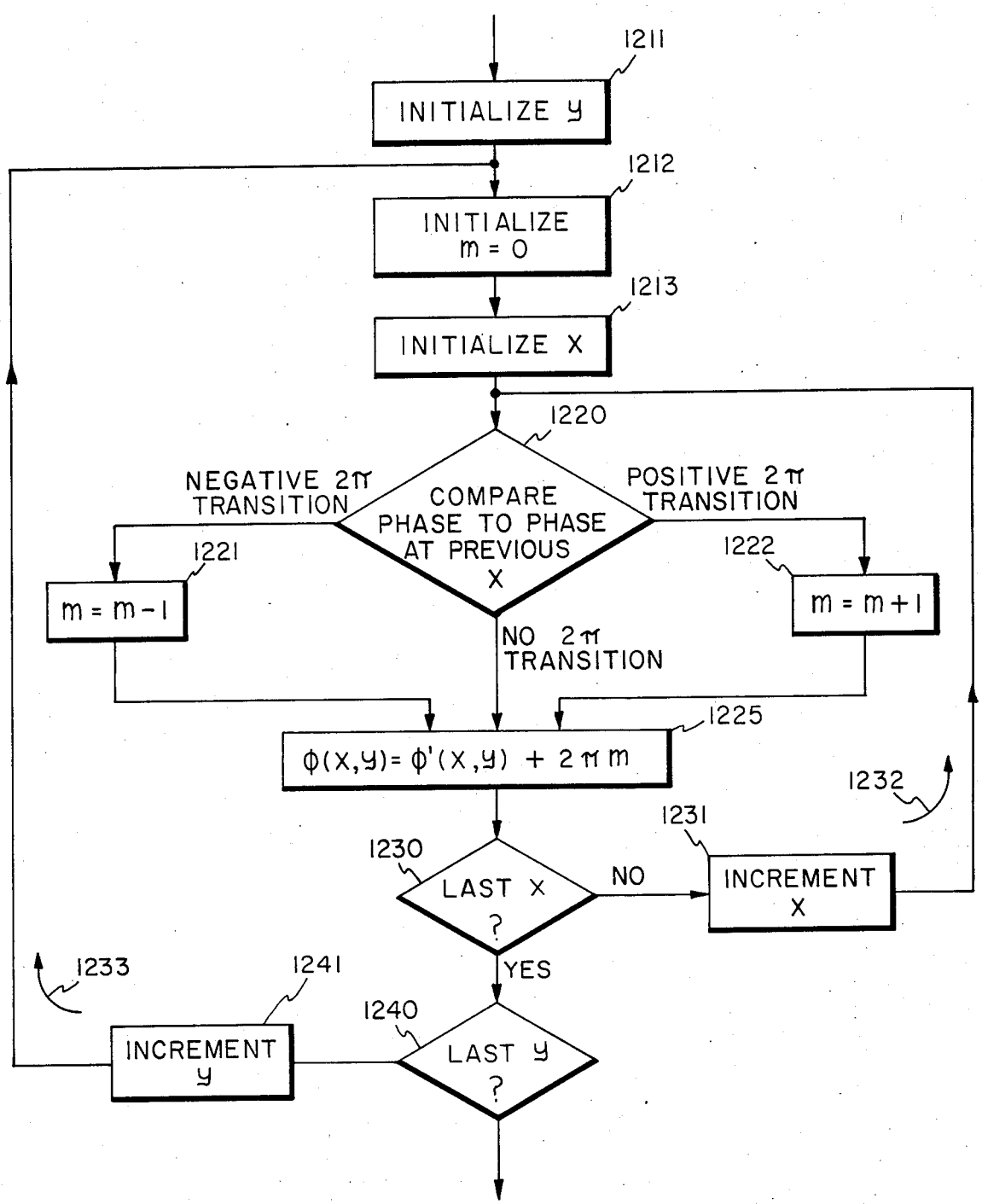
FIG. 12 is a flow diagram of a routine that is used in conjunction with the routines of FIGS. 4 and 8.

The block 441 is then entered. This block represents the procedure of assigning, for each point (x,y) the appropriate integer m (see equation (6)) by tracing the number of fringes on the reference plane image, where m is the fringe number, and then the determination of the reference plane phase for each such point. The block 442 represents the same operation for each point of the object. FIG. 12 is a flow diagram of a routine as represented by the blocks 441 and 442 for tracing the deformed grating fringes in order to assign appropriate m integer values, so that the object and reference phases $\phi_o(x,y)$ and $\phi_r(x,y)$, respectively, can be obtained from $\phi_o'(x,y)$ and $\phi_r'(x,y)$. A y coordinate index is initialized (block 1211), m is initialized at zero (block 1212), and the x index is also intialized (block 1213). Processing then proceeds on a line-by-line basis along the x direction. For a given line, at each point, the previously computed phase value (for the object phase or the reference plane phase, depending on which one is being processed), the phase at each point is compared to the phase at the previous point, as represented by the diamond 1220. The adjacent phase values are compared by determining when there is a transition over a $2\pi$ value, and the sign of the transition is also noted. The sign will depend on the slope of the object profile. Blocks 1221 and 1222, as the case may be, are then utilized to decrement or increment m, depending upon the sign of the transition, and the block 1225 is then entered. Also, if there was no transition at the point being examined, the block 1225 is entered directly. The block 1225 then represents the computation of the reference plane or object phase value (as the case may be) in accordance with relationship (6). The x index is then tested (diamond 1230) and incremented (block 1231), and the loop 1232 continues for processing of an entire line in the x direction on the detector array. When the line is complete, the y index is tested (diamond 1240) and incremented (block 1241) and the loop 1233 is continued until all lines of points have been processed.

Referring again to FIG. 4, the block 451 represents the selection of the first point (x,y) for height computation. For the particular point (x,y), the phase difference between the object and reference planes is computed in accordance with:

$$\Delta\phi(x,y) = \phi_o(x,y) - \phi_r(x,y)$$

as represented by the block 452. The distance AC (FIG. 3) can then be computed (block 453) from $$AC = P_o \frac{\Delta\phi(x,y)}{2\pi}$$

Next, the block 454 represents the conversion into height BD, which is defined as h(x,y) in accordance with equation (5) as $$h(x,y) = BD = AC \tan \theta_o$$

It can be noted that suitable calibration factor and geometric correction can also be applied to h(x,y). h(x,y) can then be stored for display or other use, as represented by the block 456. Inquiry is then made (diamond 457) as to whether or not the last point has been processed and, if not, the point being processed is incremented (block 458) and the loop 459 continues as the height values h(x,y) are obtained and stored for each point.

Figure 5:
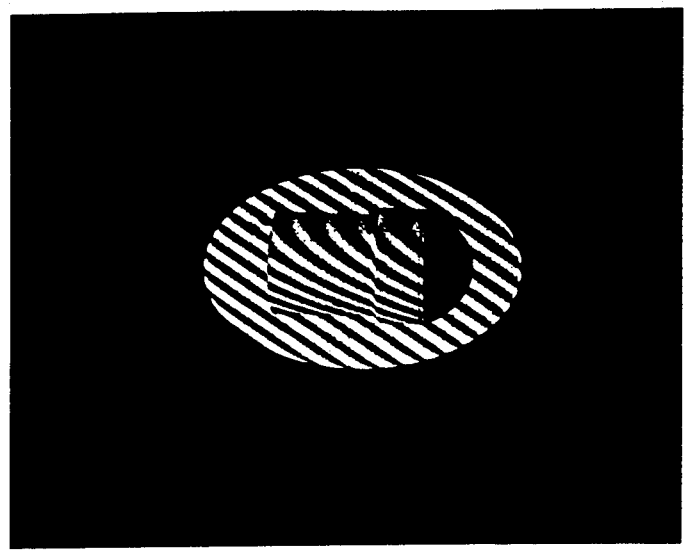
FIG. 5 shows a deformed grating interferogram of a three dimensional object as seen by the detector array of the FIG. 1 embodiment.
Figure 6:
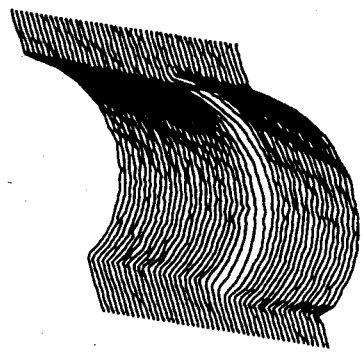
FIG. 6 is a surface profile block of the three dimensional object of FIG. 4.

As described in the parent application hereof, profile measurements were made, using the system in FIGS. 1, 2, on a general test object (a half cylinder with two sections having different radii), mounted on a reference plane and illuminated with a sinusoidally varying beam intensity as previously described. In order to generate a phase variation in both the horizontal as well as vertical directions, an inclined set of fringes were projected on the object. FIG. 5 shows the deformed grating as seen by the detector array. Three images each were recorded for the reference plane and the object surface, with a phase increment of 120° of the projected fringe pattern following each recording, and processing was performed as previously described. FIG. 6 shows part of the surface profile plot, which was generated by displaying h(x,y) using a graphics plotter. The two sections of the object with different radii and the transition region are seen. The values obtained were very close to those measured using a contact profilimeter.

Figure 7:
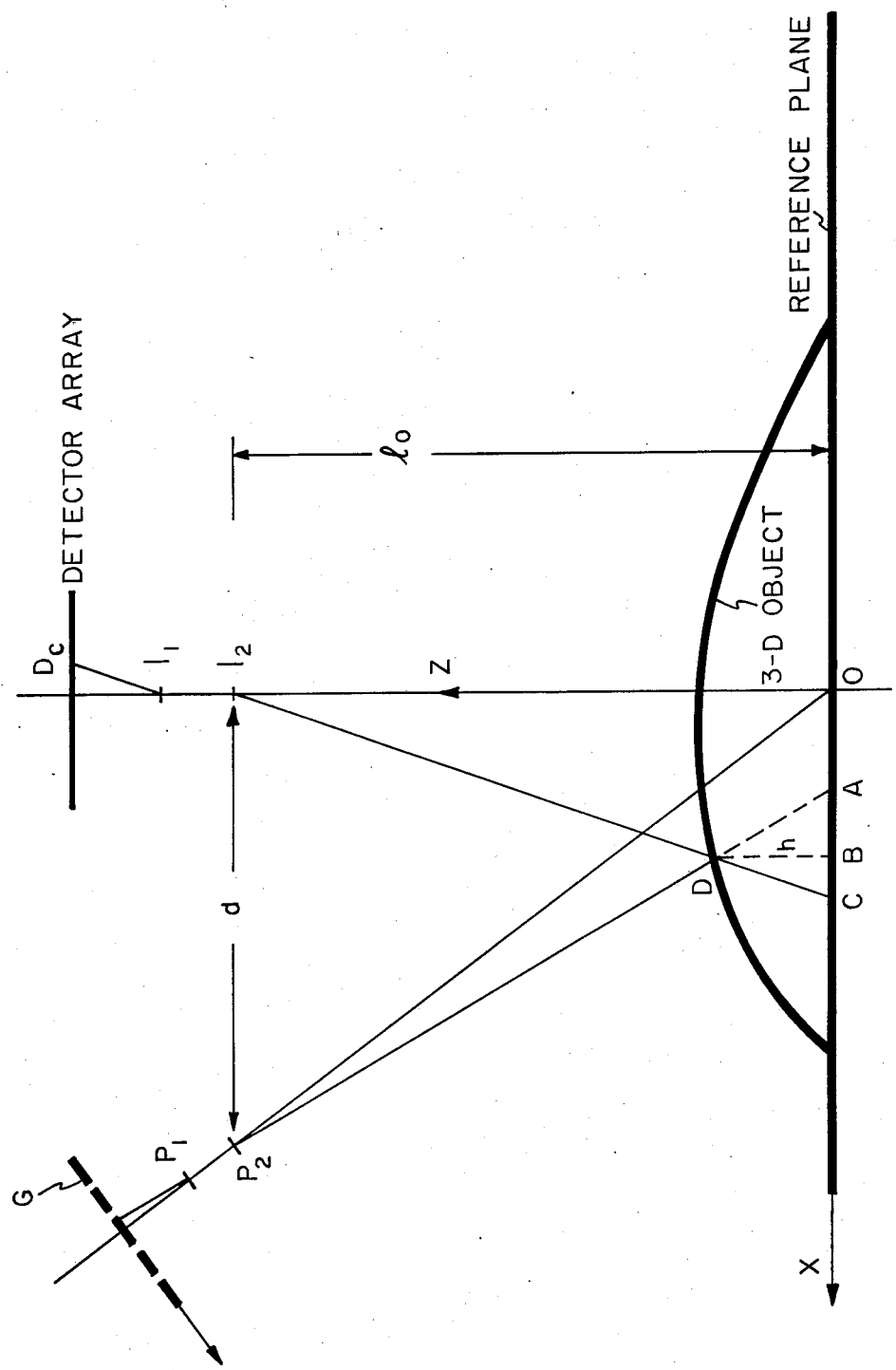
FIG. 7 is a schematic diagram which illustrates a further embodiment as set forth in the parent application hereof and is used in describing the optical geometry thereof.

In the embodiment of FIG. 7, as set forth in the abovereferenced parent application hereof, the collimated laser illumination is replaced by the projected image of a translatable white light illuminated sinusoidal transmission grating. This system requires generally less expensive hardware then the previously described embodiment, and is more capable of handling large objects. The analysis of this system, because of the divergent nature of the illumination and because the optical axes of the projection and imaging systems are not necessarily parallel, is somewhat more complicated. In the FIG. 7 arrangement it is assumed that a buffer, processor, display and projection and imaging lenses are provided, as in the previous embodiment. The optical geometry of the projection and recording systems is represented in FIG. 7. $P_1$ and $P_2$ are the centers of the entrance and exit pupils of the projection optics. $I_1$ and $I_2$ are the centers of the exit and entrance pupils of the imaging optics. G is a grating with pitch p and a sinusodial intensity transmission. $D_c$ is one element of the image sensing array. The intensity variation along x on the reference plane can be described by the equation:

$$I = a(x,y) + b(x,y) \cos \phi(x) \qquad (9)$$

where a(x,y) is the background or DC light level and b(x,y) is the fringe contrast. The phase $\phi$ in this case is a non linear function of x because of the divergent nature of the image forming rays. With respect to a reference point such as O, every point on the reference plane is characterized by a unique phase value. For example, the point C, observed by the detector D of the array, has $$\phi_c = 2\pi m + 100_c' \qquad (10)$$

where m is an integer and $0 < \phi_c' < 2\pi$.

The detector array samples the reference plane (as well as the object) and is again used to measure the phase at the sampling points by a phase shifting technique. As before, N frames of intensity data, with N>2, are recorded and after each frame the grating G is translated by a distance $p_o/N$. If $I_1, I_2, \ldots I_N$ are the intensity measurements for a point such as C, then, as previously described $$\tan\phi'_c = \frac{\sum_{1}^{N} I_n \sin(2\pi n/N)}{\sum_{1}^{N} I_n \cos(2\pi n/N)} \qquad (11)$$

As the phase function is continuous, it is possible, as previously described, to determine m in equation (10) by detecting sharp phase changes of nearly $2\pi$ which occur between two neighboring sample points, whenever a complete grating period has been sampled.

A particular detector such as $D_c$ can measure the phase $\phi_c$ at a point C on the reference plane as well as $\phi_D$ on the point D of the object. A mapping procedure is then used to determine a point A on the reference plane such that $\phi_A = \phi_D$. This enables a computation of the geometric distance AC. C is a known detector location and the position of A, which in general would lie between two sampling points, can be located by linear interpolation using known phase values. From similar triangles $P_2DI_2$ and ADC, the object height is $$h(x,y) = (AC/d)l_o'(1 + AC/d)^{-1} \qquad (12)$$

where d and $l_o$ are distances as shown in FIG. 7. As in most practical situations d >> AC because of the large magnifications involved, equation (12) can be simplified:

$$h(x,y) = (AC/d)l_o \qquad (13)$$

It can be noted that h(x,y) is the object height at the x coordinate corresponding to B and not C. From known system geometrical parameters, one can calculate the distance BC and thus determine the x coordinate corresponding to the point B.

Figure 8A:
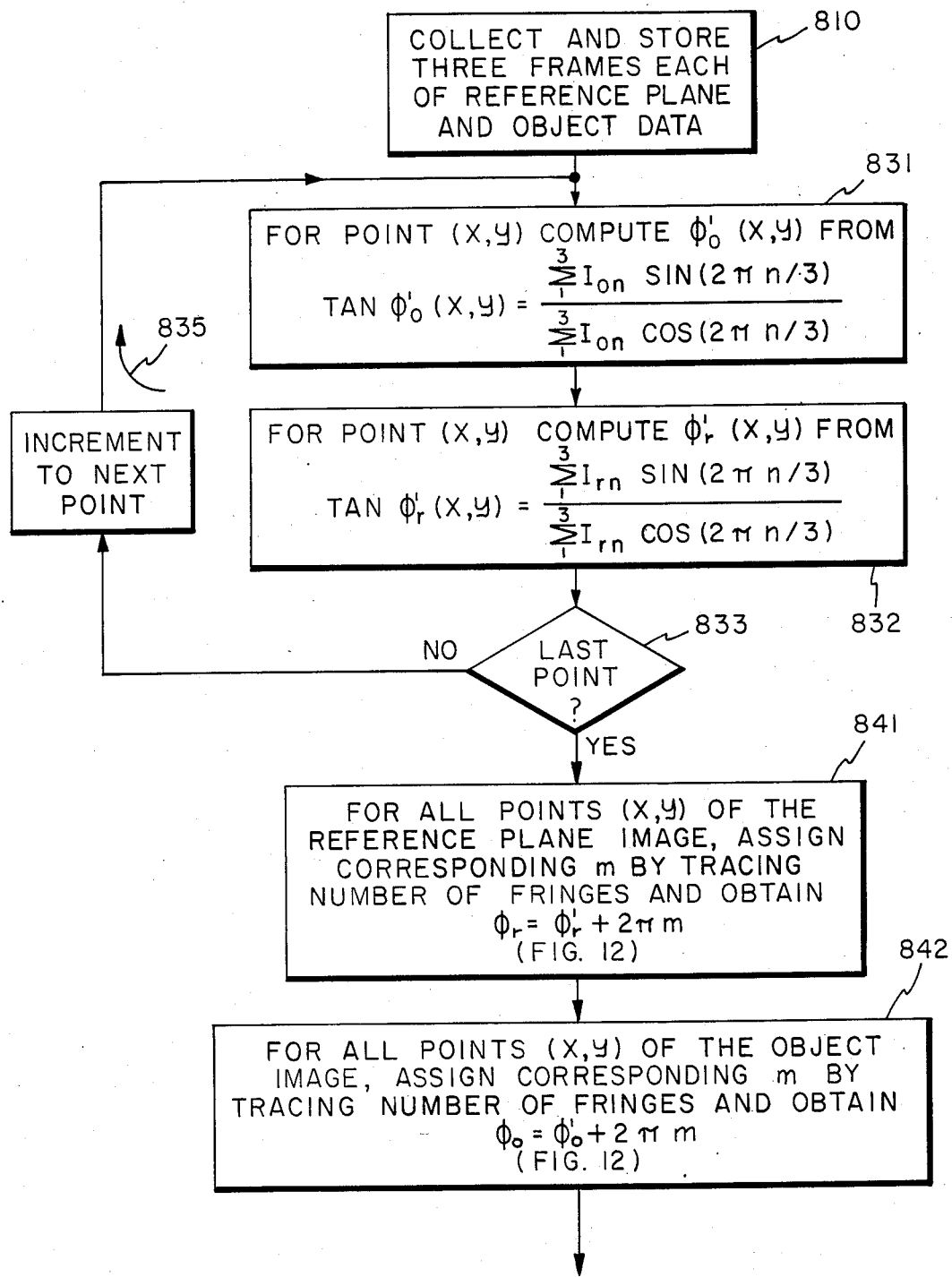
FIG. 8, which includes FIGS. 8A and 8B placed one below another, is a flow diagram of a routine for programming the processor of the FIG. 7 embodiment.

In the routine of FIG. 8, the block 810 represents the collecting and storing of three frames of reference plane and object data in a manner similar to that previously described in conjunction with the loop 415 of FIG. 4. In this case, however, in the context of the system of FIG. 7, the phase shifting will be implemented by translation of the grating G. In this case, the three arrays of object intensity values can be represented as $$I_{o1} = a'(x,y) + b'(x,y) \cos \phi_o(x,y)$$

$$I_{o2} = a'(x,y) + b'(x,y) \cos (\phi_o(x,y) + 2\pi/3)$$

$$I_{o3} = a'(x,y) + b'(x,y) \cos (\phi_o(x,y) + 4\pi/3)$$

and the three arrays of reference plane intensity values can be represented as $$I_{r1} = a'(x,y) + b'(x,y) \cos \phi_r(x,y)$$

$$I_{r2} = a'(x,y) + b'(x,y) \cos (\phi_r(x,y) + 2\pi/3)$$

$$I_{r3} = a'(x,y) + b'(x,y) \cos (\phi_r(x,y) + 4\pi/3)$$

For a point (x,y), the object phase $\phi_o'$ is then computed from $$\tan\phi'_o(x,y) = \frac{\sum_{1}^{3} I_{on}\sin(2\pi n/3)}{\sum_{1}^{3} I_{on}\cos(2\pi n/3)}$$

and the reference phase $\phi_r'$ is computed in accordance with $$\tan\phi'_r(x,y) = \frac{\sum_{1}^{3} I_{rn}\sin(2\pi n/3)}{\sum_{1}^{3} I_{rn}\cos(2\pi n/3)}$$

These functions are represented by the blocks 831 and 832, and are consistent with the equation (11) above. The loop 835 then continues, in similar manner to that previously described in conjunction with FIG. 4, to obtain the reference and object phases for all desired points (x,y), diamond 833 and block 834 being used in the loop in the manner previously set forth.

Next, as represented by the block 841, for each point (x,y), the appropriate integer m (see equation (10)) is obtained by tracing the number of fringes on the reference plane image, where m is the fringe number, and the reference plane phase for each such point is then determined. The block 842 represents the same operation for each point of the object. Reference can again be made to FIG. 12, and the accompanying description above, for the manner in which the resultant phases $\phi_r(x,y)$ and $\phi_o(x,y)$ are obtained.

Figure 8B:
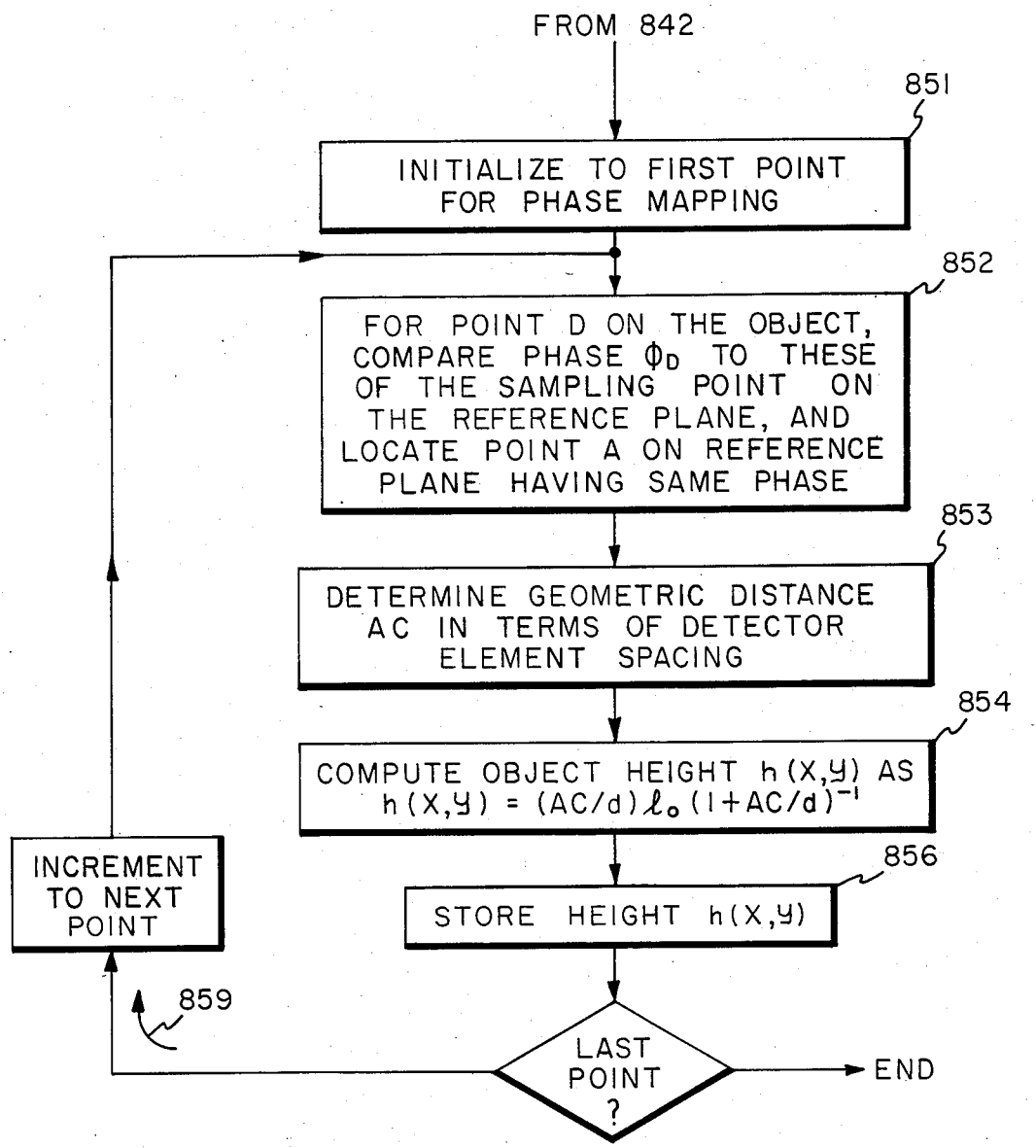

FIG. 8B inlcudes the phase mapping portion of the routine. A first point is selected for phase mapping, as represented by the block 851. For the point D on the object, the phase $\phi_o(x,y)$ is compared to the phases of the sampling points on the reference plane, so as to locate point A on the reference plane which has the same phase. The geometric distance AC, between the points having the same phase, is then determined in terms of detector element spacings (block 853). The object height can then be computed (equation (12)) as:

$$h(x,y) = (AC/d)l_0(1 + AC/d)^{-1}$$

as represented by the block 854. Alternatively, as described above, equation (13) could be used in some situations. Again, suitable calibration factor and geometric correction can then be applied, and the height h(x,y) is stored, as represented by block 856. Inquiry is then made (diamond 857) as to whether or not the last point has been processed. If not, the point to be processed is incremented (block 858), and the loop 859 is continued to completion.

As described in the parent application hereof, for experimental measurements, sinusoidal gratings were generated by photographing out of focus a square wave grating pattern. A conventional slide projector was modified in order to operate with a grating slide, mounted on a stepper motor driven translation stage. The period of the projected grating measured on the reference plane, close to the optical axis of projection, was about 15 mm. Deformed grating images were recorded on a 128×128 photodiode array detector. Phase measurement was by a three discrete phase shift implementation of equation (11), and processing was in accordance with the routine previously described.

Figure 9:
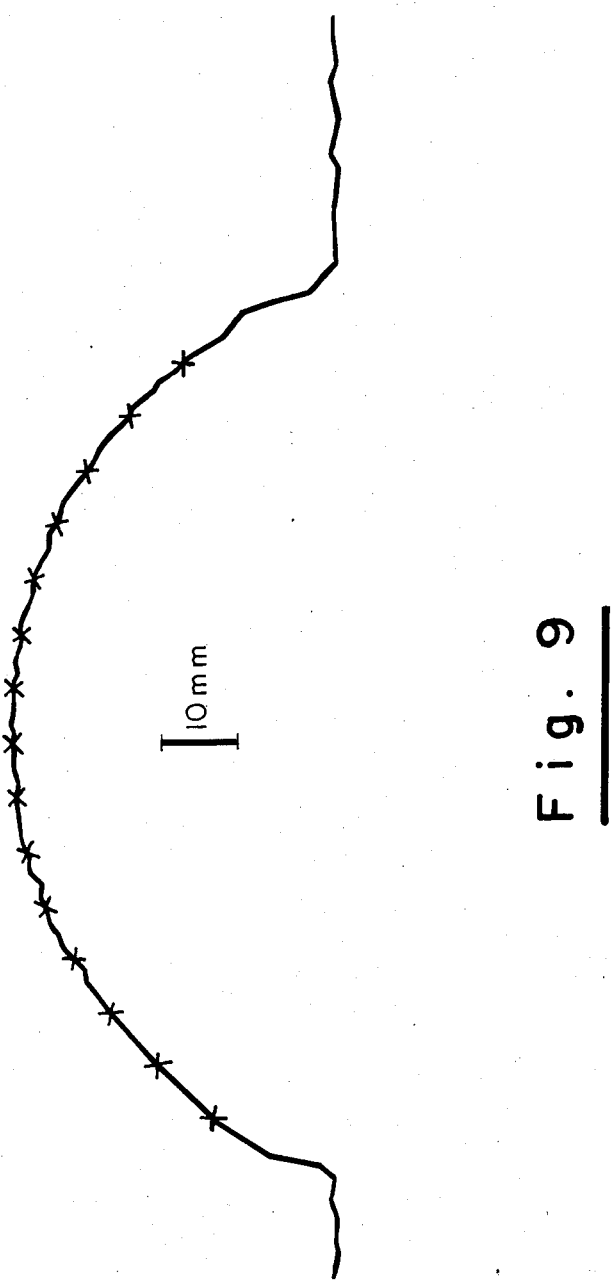
FIG. 9 shows the result of a calibration experiment, using a technique in accordance with the embodiment of FIG. 7.

The results of a calibration experiment, using a cylindrical test object, which had been measured by a mechanical contact profilometer, are shown in FIG. 9. The line profile was generated using the experimental optical system and the 'X' marks indicate measurements made by a manual contact profilometer. An agreement of better than 1% between the measurements was observed, except in the regions with steep slopes where mechanical contact methods are not very reliable.

Figure 10:
FIG. 10 shows a mannequin face with a projected sinusoidal grating of 15 mm period.
Figure 11:
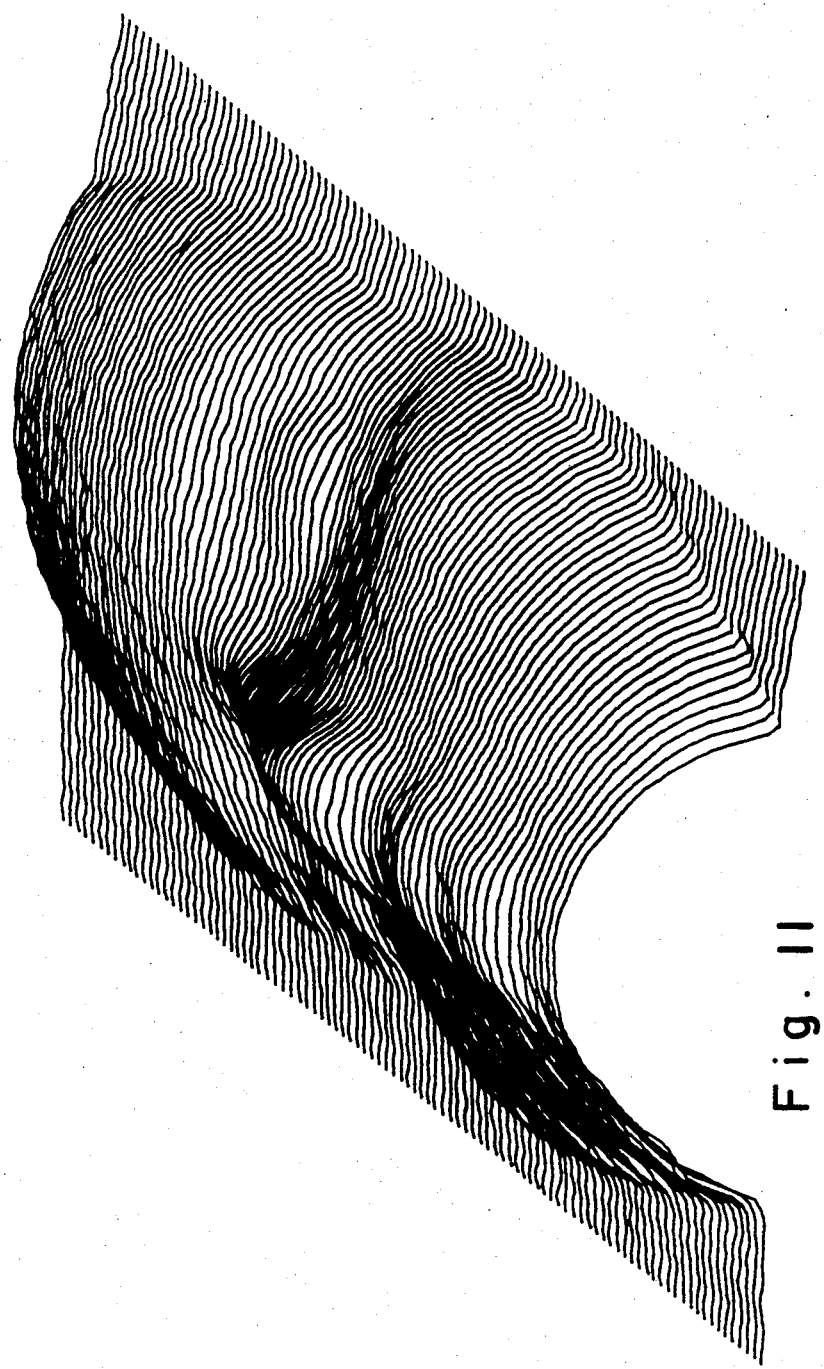
FIG. 11 is a perspective profile plot of the mannequin face with respect to a reference plane.

A more general type of diffuse object, a mannequin face, was also measured. FIG. 10 shows the deformed grating produced by this object. FIG. 11 is a graphical representation of the results obtained with the optical system and shows 97 profile lines with 87 points on each line. This object was approximately 150 mm wide and the depth at the tip of the nose measured from a reference plane was about 10 mm. In order to obtain a complete shadow free illumination of such objects and obtain a large angular field of view, two or more projected gratings may be used.

In accordance with an embodiment of the improvement of the present invention, a complete 360 degree view, or a desired portion thereof, of a three-dimensional object, is obtained with minimal complication and processing. Consider the arrangement of FIG. 13 which, like FIG. 7, employs a projected image of a translatable white light illuminated translatable grating, G. In this case the projection and imaging optics are respectively represented in the Figure by lenses 1301 and 1302. A linear detector array 1350, for example a photodiode array, is provided. A three-dimensional object 1310, a mannequin head in the illustration, is mounted on rotatable table 1315 which is driven in rotation increments using motor 1320 which, in the present embodiment, is under control of a processor (to be described). It will be understood that the relative rotation as between the optical system and the object can be implemented by any suitable means and, if desired, the optical system can even be rotated around the object, although this is usually less preferred. The sinusoidal grating is projected onto the object and the resulting deformed grating is reimaged onto the linear detector array 1350. The distance h, which in this case is the distance of an object point D from a reference line, when determined for each vertical (y) position, gives the object profile in the slice defined by the Y-Z plane. This is a "line profile of the object surface at the slice taken at a rotational angle $\theta$ (FIG. 13b). As the object is rotated around the Y-axis in incremental steps, every h-value obtained corresponds to the radial distance $\Delta r$ of a general point P from a reference virtual cylinder of radius R, as shown in FIG. 13b.

The complete 3-D object data can be obtained through a 360 degree rotation of the object, and can be expressed in terms of $\Delta r(Y,\theta)$ in cylindrical coordinates. If desired, a general object point P can be represented in relation to a global system of coordinates X, Y, Z using the transformation $$X = R \sin(\theta)[1 - \Delta r/R] \quad (14)$$

$$Z = R \cos(\theta)[1 - \Delta r/R] \quad (15)$$

Figure 13A:
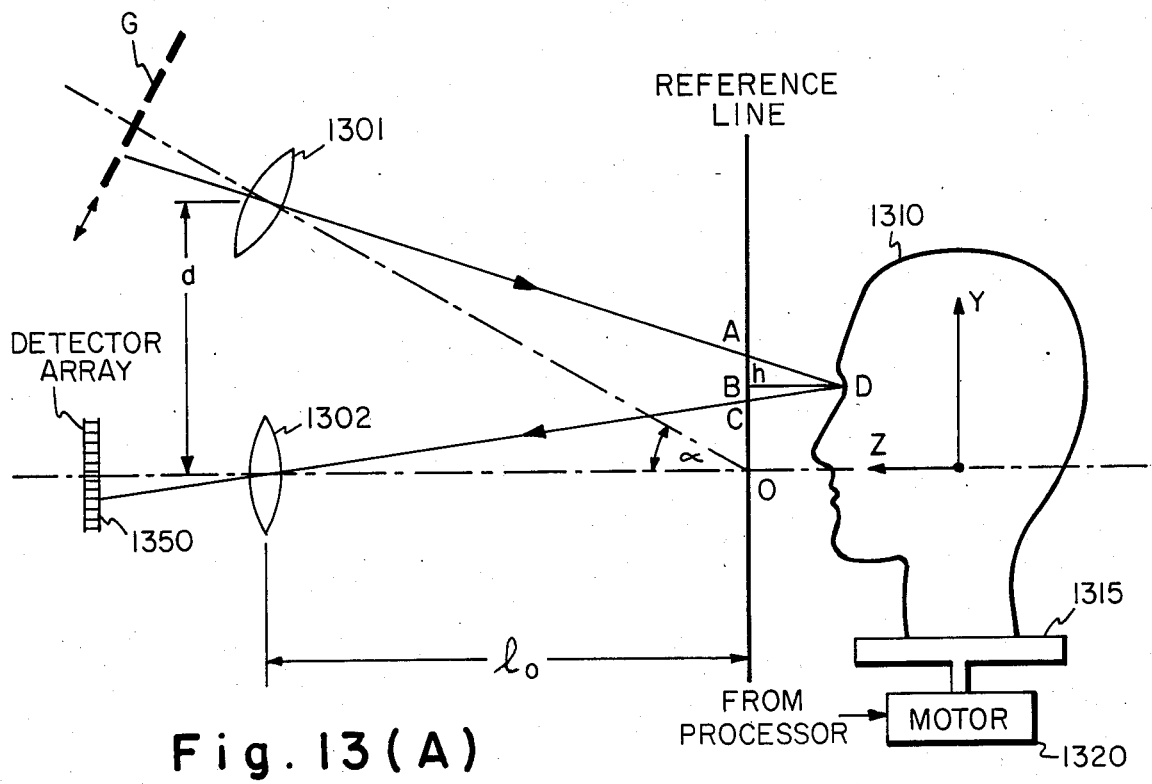
FIG. 13 illustrates the geometry used for analysis of operation of a form of the invention, and shows elements of the invention.
Figure 13B:
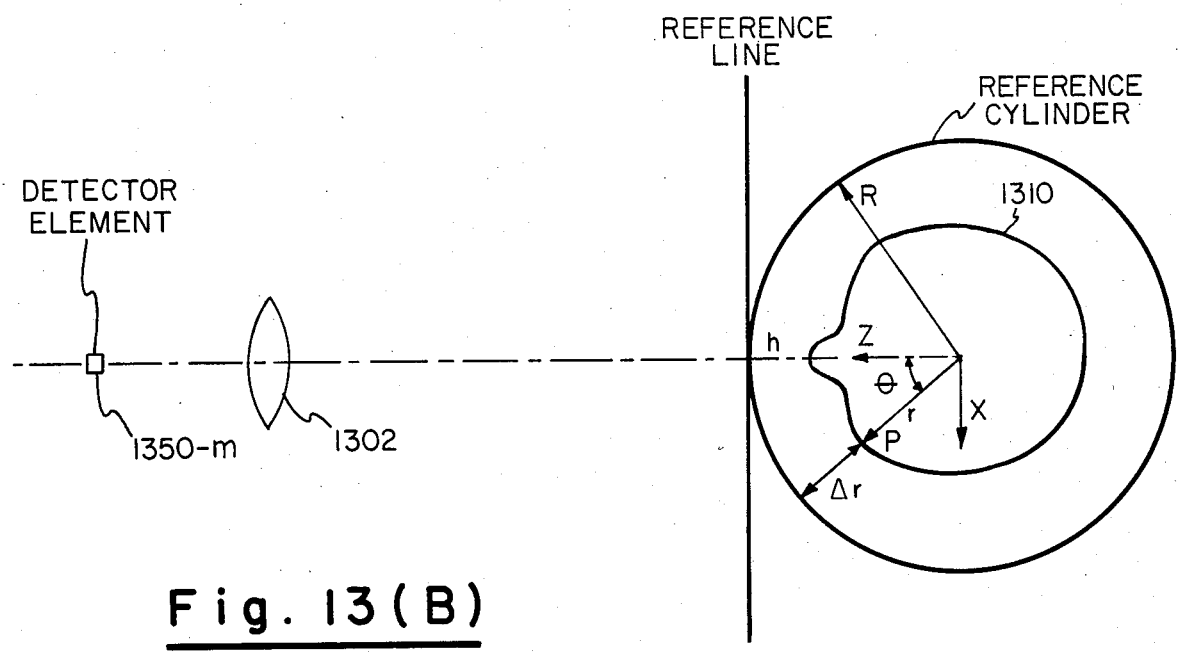

The values of $\Delta r$, for a given line profile corresponding to a $\theta$ value, are obtained using the following procedure: Three frames of line intensity data, $I_1$, $I_2$, and $I_3$ are recorded for three grating positions phase-shifted by $2\pi/3$. Three frames of line intensity data are also determined for the reference line. [This only need be done once, since the reference line is the same for all profiles. Again, the reference data can be computed without direct measurement, if desired.] Next, $\Delta r$ (or h) is determined by using a phase-mapping technique, as was described above. A particular detector in the linear array 1350 measures the phase $\theta_C$ at point C on the reference line as well as Phase $\theta_D$ at the corresponding point D on the object. A mapping procedure can then be used to determine a point A on the reference line such that $\theta_C = \theta_D$, enabling the computation of the geometric distance AC in terms of detector spacings. $\Delta R$ or h is determined from relationship (12) above, i.e.

$$\Delta r = h = (AC/d)l_0(1 - AC/d)^{-1}$$

where distances d and $l_o$ are as shown in FIG. 13a. Once again, if AC/d<<1, then $$\Delta r = (AC/d)l_o \quad \text{(equation 13)}$$

The object is then stepped to the next rotational angle, $\theta$, and the next line profile is obtained. It will be understood that the data can all be obtained before line profiles are computed or, alternatively, line profile computations can be made between taking data or contemporaneous therewith. As a further alternative, the data for each line profile can be taken for a first phase of the incident beam, and then the grating shifted and the data again taken for the second and then the third phases of the incident beam. If desired or advantageous for storing or plotting the three dimensional object, the $\Delta r$ values can be inserted into equations (14) and (15) to obtain the governing equations for a general point description as follows:

$$X = \sin(\theta)(R - AC \cdot l_o/d) \quad (16)$$

$$Z = \cos(\theta)(R - AC \cdot l_o/d) \quad (17)$$

These expressions represent the 'wrapping' of the data to obtain the final 3-D shape with reference to a global X, Y, Z, coordinate system. The geometrical parameters of equations (16) and (17) can be obtained or verified through precalibration experiments.

Figure 14:
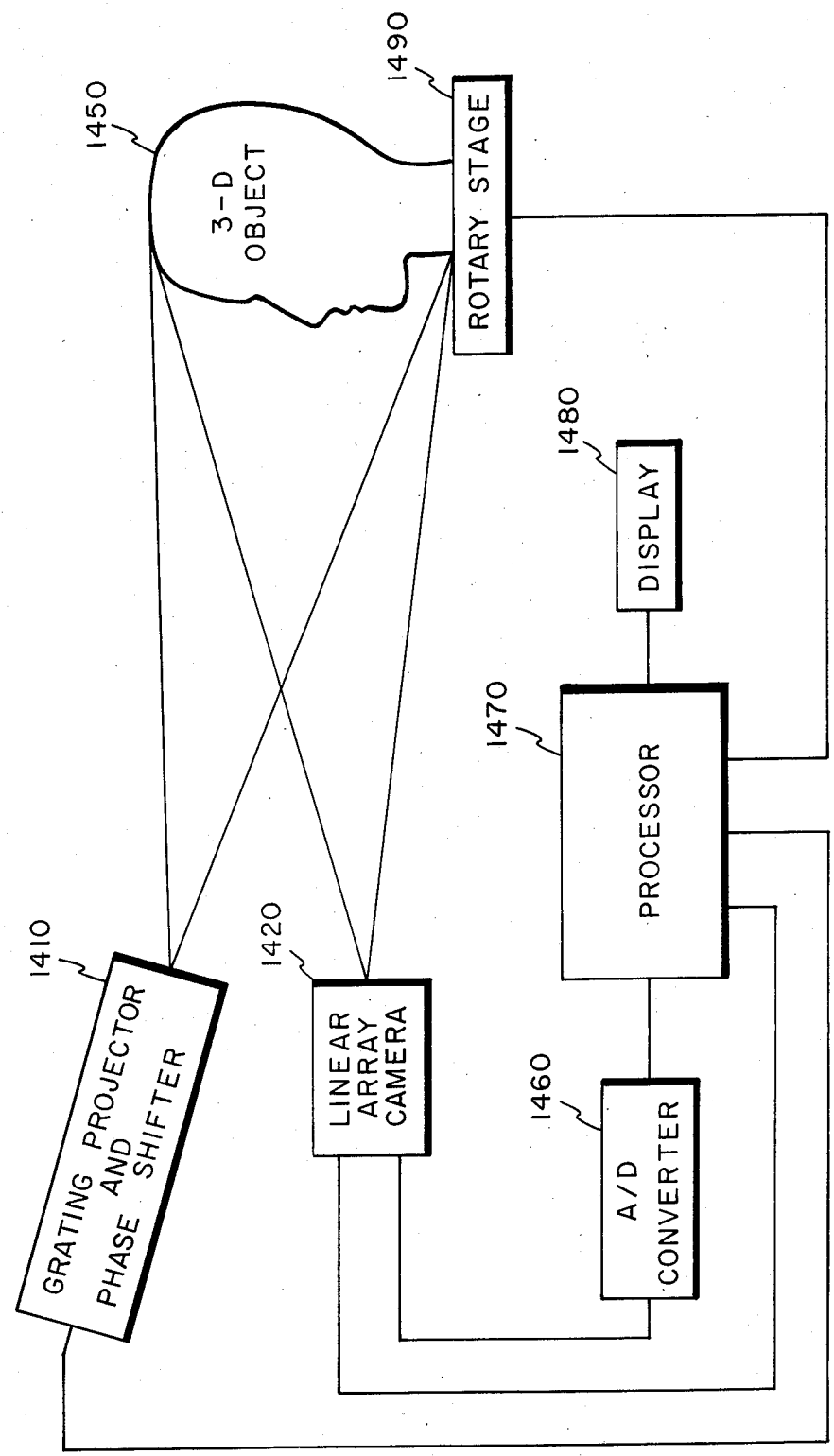
FIG. 14 is a block diagram, partially in schematic form, of an apparatus in accordance with an embodiment of the invention, and which can be used to practice the method of the invention.

FIG. 14 shows a block diagram of an embodiment of an apparatus in accordance with the invention. A sinusoidal grating projection system and phase shifter 1410 is provided, and projects an optical beam at a three dimensional object 1450, which is mounted on rotary stage 1490. The grating projector and phase shifter 1410 includes a source of white light illumination, a movable sinusoidal grating (e.g. G of FIG. 13a) and a projection optical (e.g. 1301 of FIG. 13a). The rotary stage 1490 may comprise a rotatable table 1315 and processor-controlled motor 1320, as shown in FIG. 13a. A linear camera array 1420 includes imaging optics (e.g. 1302 in FIG. 13a) and a linear detector array (e.g. 1350-m of FIG. 13a). The linear detector array may alternately be implemented by scanning one line of a two dimensional array. Information from camera 1420 is digitized by analog-to-digital converter 1460, and the resultant digital signals are coupled to processor 1470. Again, the processor may be for example any suitable digital or analog (in which case no A/D would be required) computer, processor, or microprocessor and associated memory and peripherals, programmed consistent with the teachings hereof, a Digital Equipment Corp. Model LSI11/23 having been employed in one implementation. The processed information can be displayed on a display device 1480.

Figure 15:
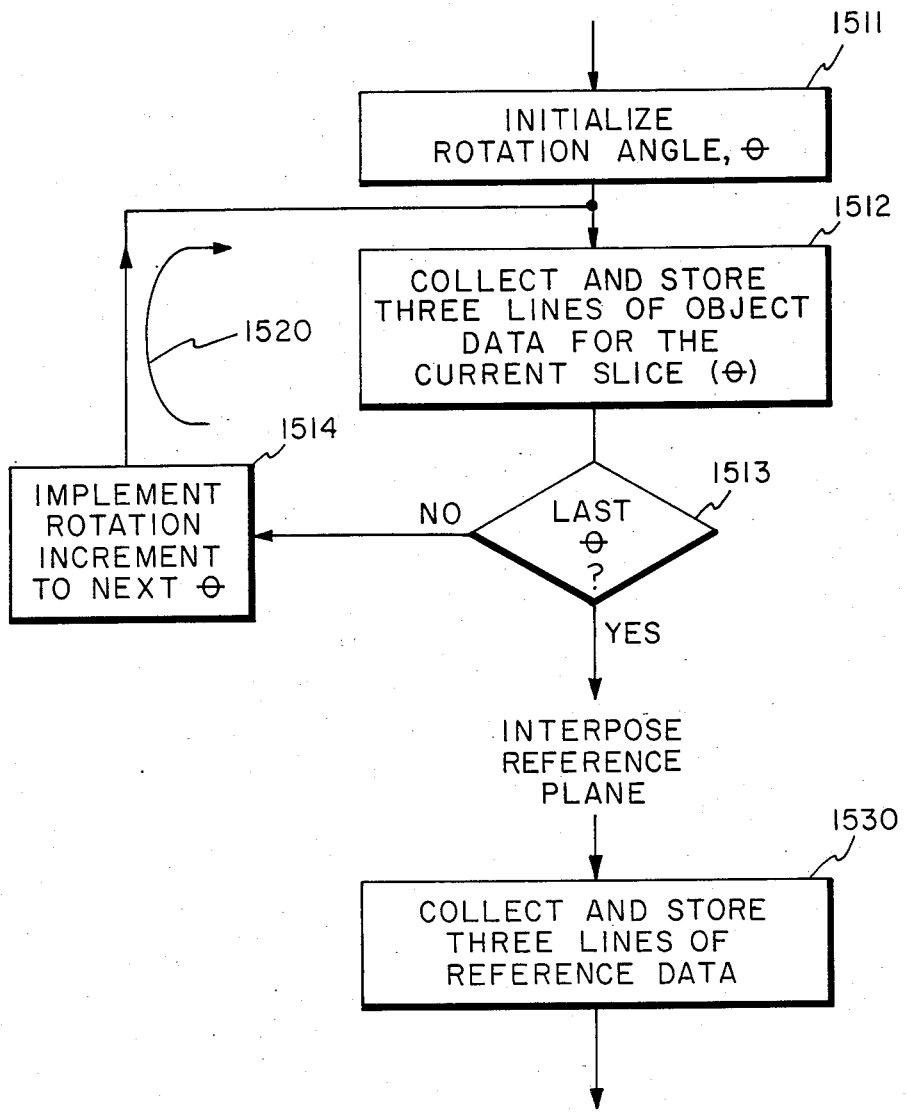
FIG. 15 is a flow diagram of a routine for programming the processor of the FIG. 14 embodiment to obtain object and reference data.

Referring to FIG. 15, there is shown a flow diagram of the routine for the processor 1470 of the FIG. 13 embodiment, utilized to obtain data from which line profiles of an object are generated. The block 1511 represents the initiation of the system at an initial rotation angle, $\theta$. The block 1512 is then entered, this block representing the collection and storage of three lines of object data for the current line profile (or slice), at rotation position $\theta$. This is done, for example, by storing the intensity value obtained at each detector element of the linear detector, shifting the grating G to obtain a phase shift of $2\pi/3$, whereupon another line of data is taken at the detector elements and stored; followed by another phase shift of $2\pi/3$, and collection and storage of data. After the data for the current line profile is collected, inquiry is made (diamond 1513) as to whether or not the last angle 0 has been processed; i.e., whether or not a full 360 degrees of rotation increments has been implemented, in the present example. If not, rotation to the next increment is implemented (block 1514), and the loop 1520 is continued, as a full set of data is obtained and stored.

A reference plane can then be interposed (e.g., automatically or manually) and the collection and storage of three lines of reference data, for the three different reference phases, is obtained and stored in the same manner, as represented by the block 1513. Since the reference plane (which, when detected by the linear detector array, can be considered as a reference line) does not change, this data is taken only once. In the present embodiment, the object data is taken and stored continuously, although it will be understood that processing can be implemented, if desired, during the data acquisition mode; for example, by processing each line profile after the data is taken for said line profile (either before the data is taken for the next line profile, or contemporaneously therewith, such as on a time-sharing basis). Also, as previously indicated, a full set of data can be taken at a first phase of the incident beam, followed by repeats at second and third phases of the incident beam.

Figure 16:
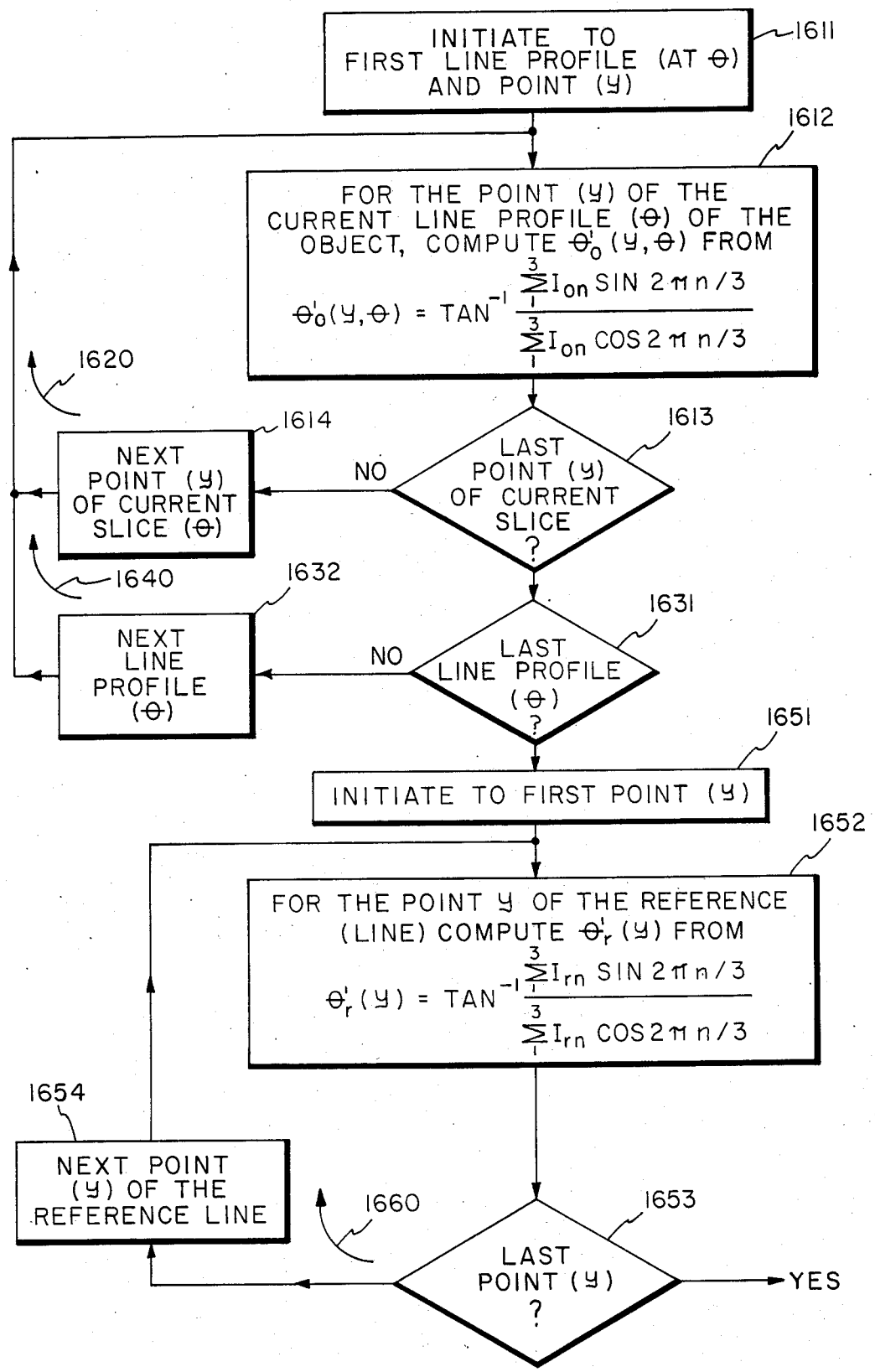
FIG. 16 is a flow diagram of a routine for programming the processor of the FIG. 14 embodiment to obtain object and reference phases to be used in profile distance determination.

Referring to FIG. 16, there is shown a flow diagram of the routine for obtaining the object phase $\phi_o'(y,\theta)$ and the reference phase $\phi_r'(y,\theta)$ for each point y of each line profile (at reference angle $\theta$), from the data taken in the routine of FIG. 14. The block 1511 represents the initialization to the first line profile (at initial angle $\theta$, and the first point, y). The object phase $\phi_o'$ is then computed, using the relationship of equation (11), as:

$$\phi'_o(y,\theta) = \tan^{-1} \frac{\sum_{1}^{3} I_{on}\sin 2\pi n/3}{\sum_{1}^{3} I_{on}\cos 2\pi n/3}$$

Inquiry is then made (diamond 1513) as to whether or not the last point, y, of the current line profile has been processed. If not, the point index is incremented (block 1514) to the next point y of the current line profile, and the loop 1520 is continued until all values of $\phi_o'(y,\theta)$ for the current line profile are obtained. When the inquiry of diamond 1513 is answered in the affirmative, the diamond 1531 is entered, and inquiry is made as to whether or not the last line profile has been processed. If not, the rotation angle index $\theta$ is incremented (block 1532), and the phases are obtained for each point y for the next line profile reference angle $\theta$ (via loop 1520), and the loop 1540 continues until all of the phase values $\phi_o'(y,\theta)$ have been obtained.

Next, a similar routine is utilized to obtain the reference phase angles $\phi_r'(y)$ for the points y on the reference line, as follows: The reference point index is initialized to the first point y (block 1551), and the reference phase $\phi_r'(y)$ is obtained using the relationship:

$$\phi'_r(y) = \tan^{-1} \frac{\sum_{1}^{3} I_{rn}\sin 2\pi n/3}{\sum_{1}^{3} I_{rn}\cos 2\pi n/3}$$

as represented by the block 1552. The loop 1560 then continues, in a manner similar to that just described with respect to the object phase computations, with the point index y being incremented (block 1554) and the loop continuing until the inquiry of diamond 1553 indicates that the reference phases have been obtained for all points y of the reference line.

It will be recalled that the $\phi'$ values represent the component of the phase $\phi$ that is between 0 and $2\pi$ (e.g. equation (10) above), and that $\phi$ can be obtained from $$\phi = 2\pi m + \phi'$$

wherein it can be determined, as previously described, by detecting sharp phase changes of nearly $2\pi$ which occur between two neighboring sample points, whenever a complete grating period has been sampled.

Figure 17:
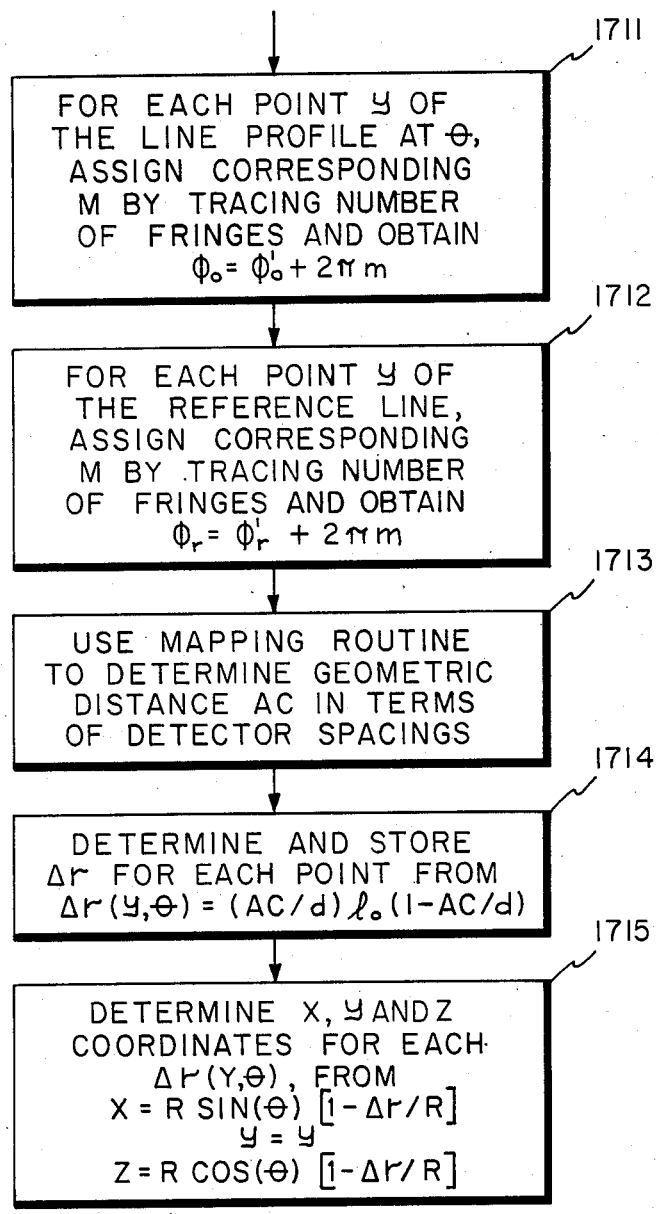
FIG. 17 is a block diagram of a routine for programming the processor of the FIG. 14 embodiment to obtain distances and coordinates on the surface profile.

In the diagram of FIG. 17, the block 1711 represents the determination of the $\phi_o(y,\theta)$ values from the previously obtained values of $\phi_o'(y,\theta)$ by obtaining a value for m for each point, using the routine of FIG. 12. The block 1712 represents the same operation, but in this case the values $\phi_r(y)$ are obtained for each point y of the reference line; again, by assigning values of small m by tracing fringes, using the routine of FIG. 12. The block 1713 represents the use of a mapping routine (of the type shown in FIG. 8B) to determine the geometric distance AC in terms of detector spacings. The value $\Delta r(y,\theta)$ for each point is then obtained, in accordance with the relationship set forth above as $$\Delta r = (AC/d) l_o (1 - AC/d)^{-1}$$

as represented by the block 1714. Having obtained the contour profiles in cylindrical coordinates, the relationships (14) and (15) can then be used to obtain the three dimensional surface profile of the object in rectangular coordinates, as represented by block 1715.

Figure 18:
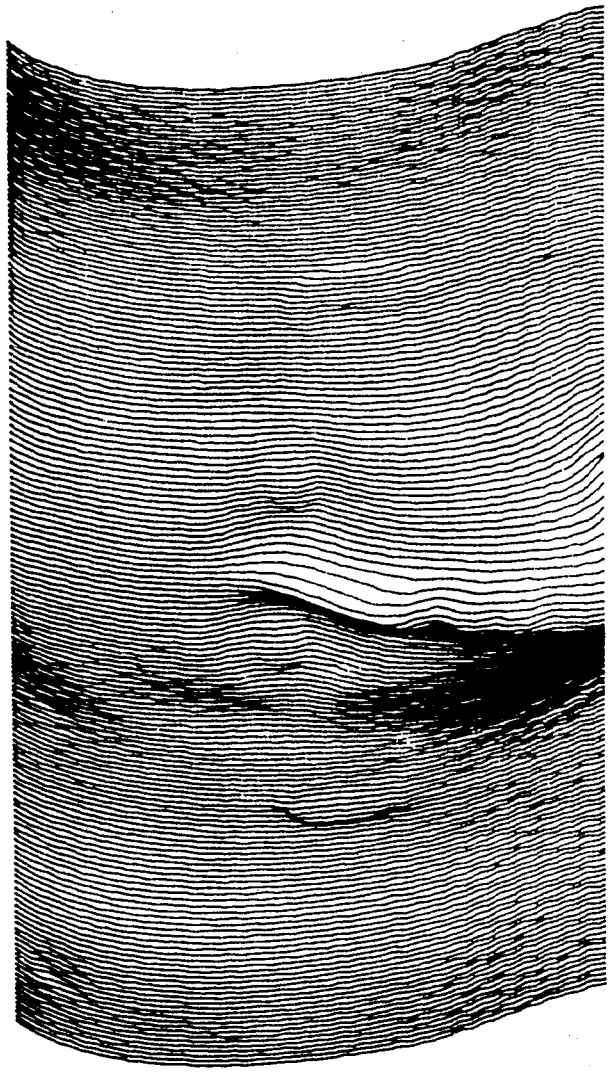
FIG. 18 shows line profiles obtained using an experimental form of the invention.
Figure 19:
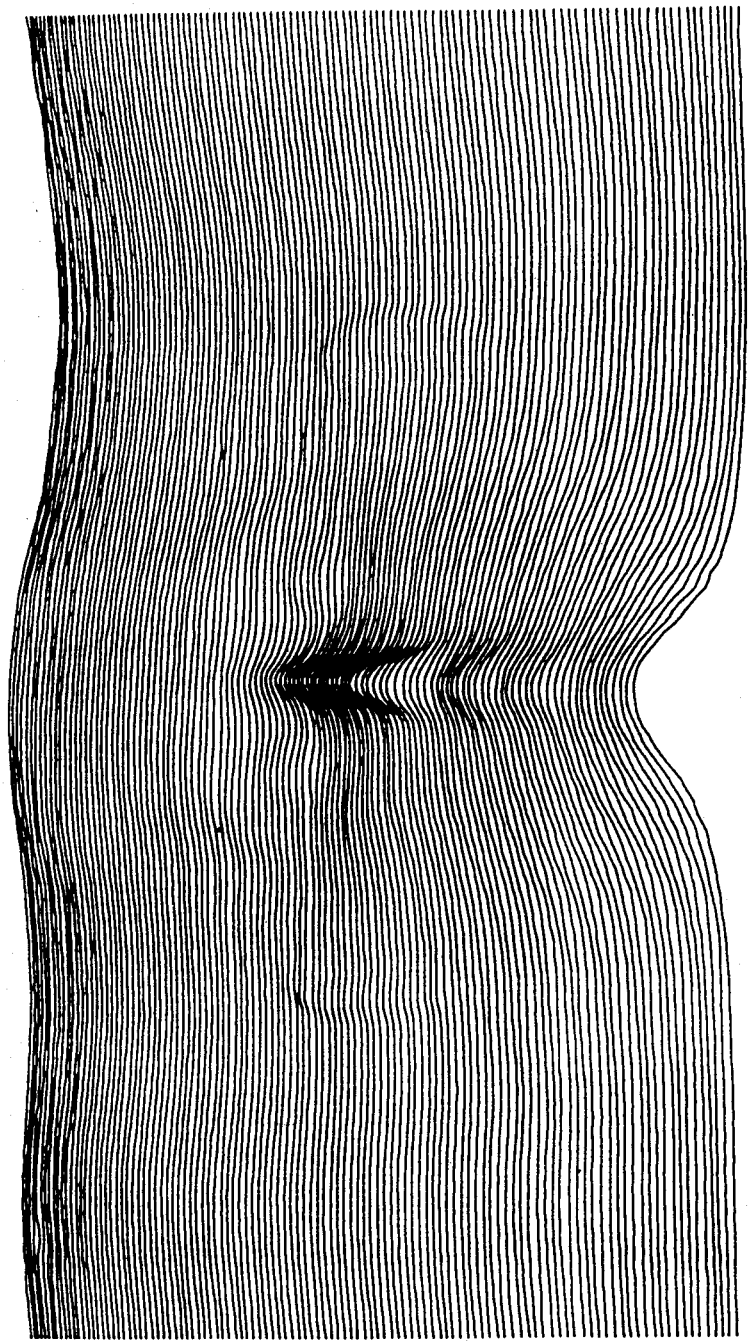
FIG. 19 shows the information from FIG. 18, presented in a different direction.
Figure 20:
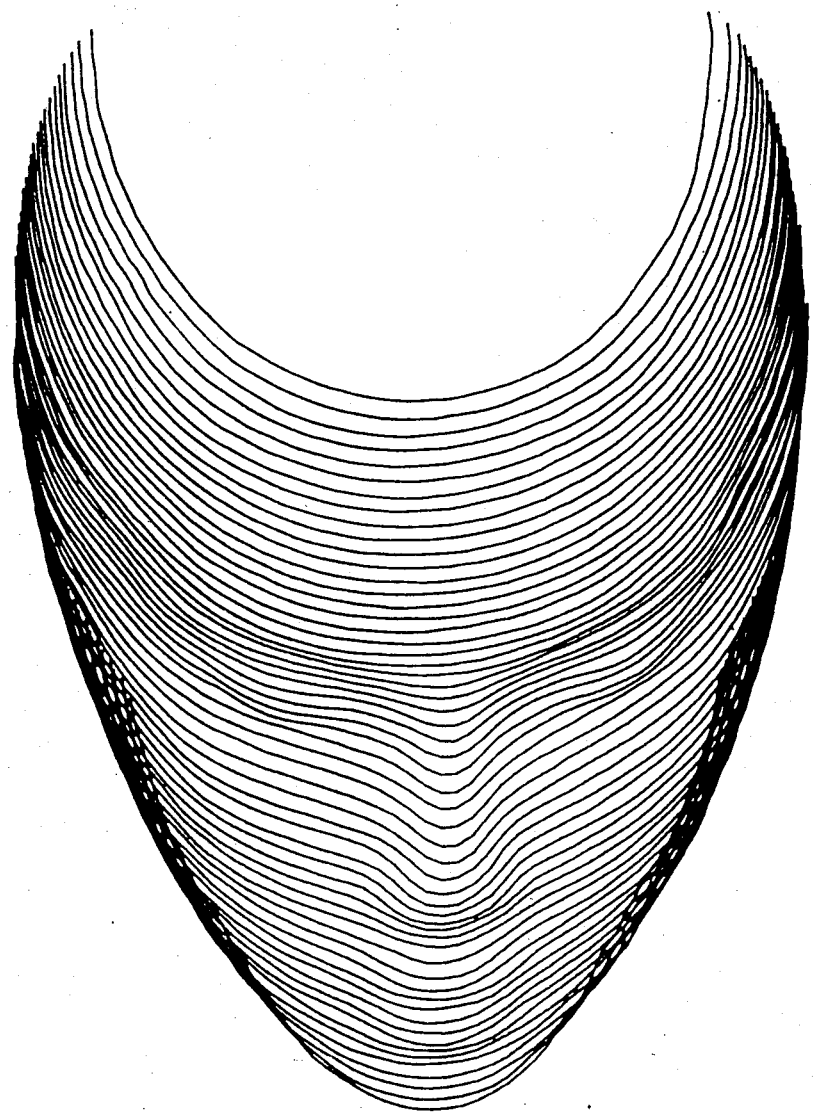
FIGS. 20, 21, 22 and 23 illustrate three dimensional plots as obtained using an experimental form of the invention.
Figure 21:
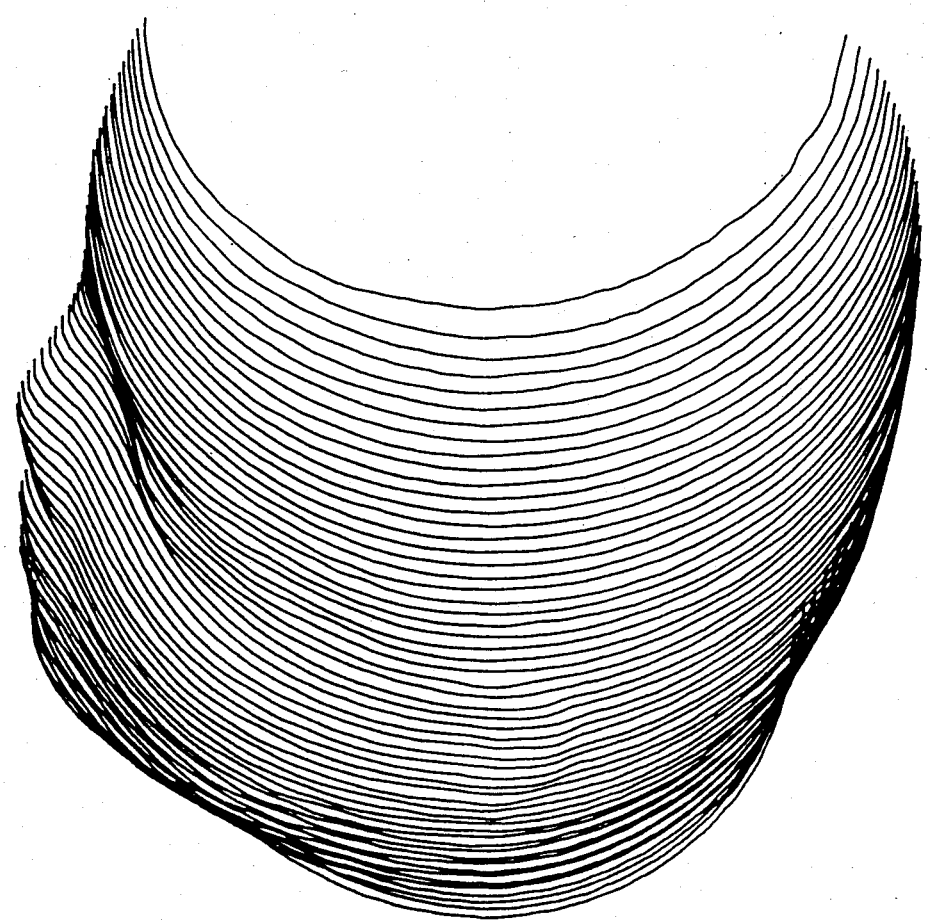
Figure 22:
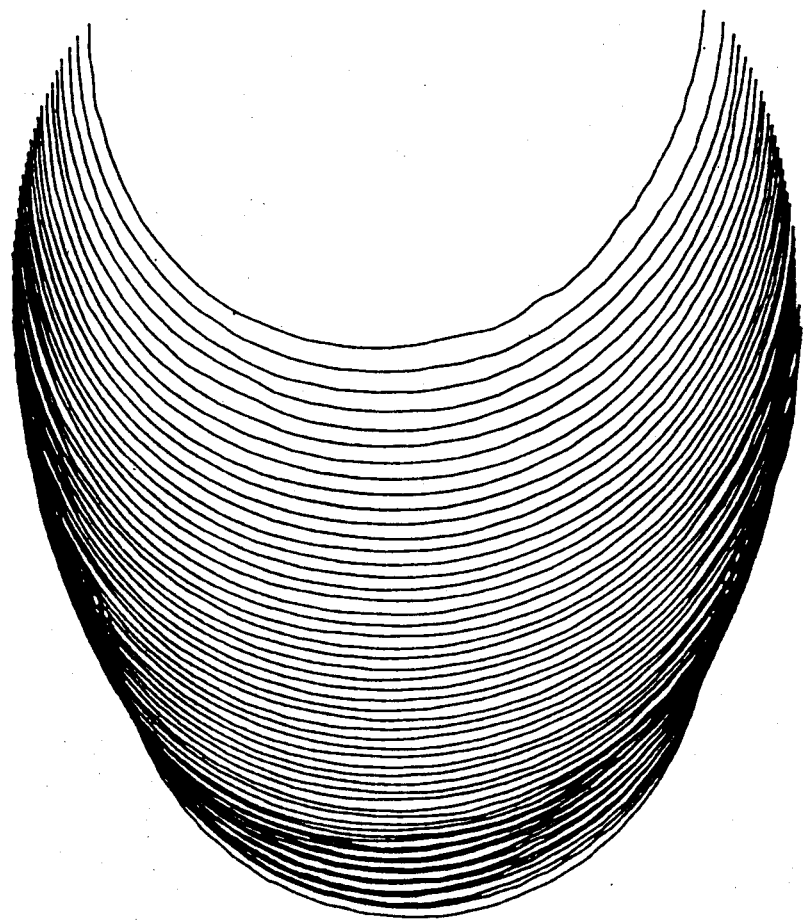
Figure 23:
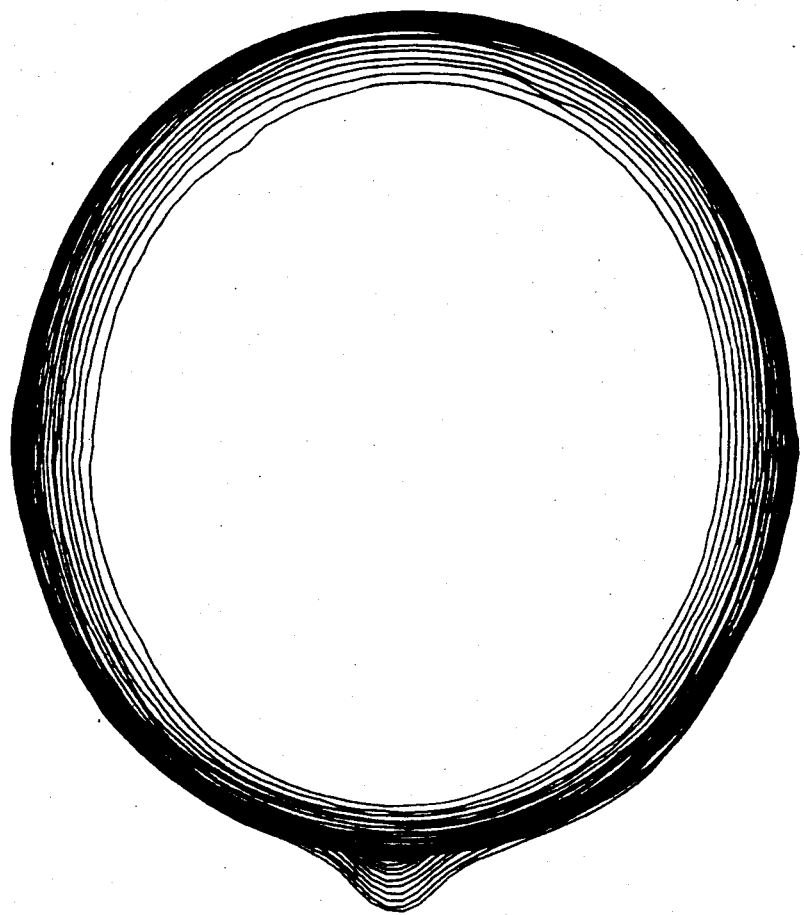

In an experimental system, a 128 by 128 photodiode array was employed and a single column of data was read out and then processed as previously described. A mannequin head was again chosen as a test object. The projected grating pitch on the object was 15 mm and the angle between the projection and imaging axes $\alpha = 20$-degrees, resulting in an equivalent system wavelength of 45 mm. The object was rotated through 360-degrees in step increments of 2-degrees, resulting in a total of $128 \times 180$ sampling points. The final results were displayed on a graphics monitor and recorded on a high-resolution plotter. FIG. 18 shows the 180 line profiles that were obtained for the mannequin head, directly from the raw data. FIG. 19 shows the same information, but with the lines presented in the $\theta$ direction. The "wrapping", obtained by the transformation indicated in equations (14) and (15) leads to the reconstruction of the actual 3-D shape in the global rectangular coordinates. Pictorial representation from different perspective are shown in FIGS. 20, 21, 22 and 23. In these pictures, every other data line in the Y direction has been plotted. With the available 3D data it is also possible to fit mathematical surfaces for the entire 360-degree object, and using computer graphics techniques, solid shaded surface displays can be created.

The invention has been described with reference to particular preferred embodiments, but variations within the spirit and scope of the invention will occur to those skilled in the art. For example, various alternative types of projection and detector systems can be used, consistent with the principles of the invention. Also, if desired, laser illumination can be used (e.g., in FIG. 2) to obtain line profiles and phase difference between computed object and reference phases can be used to compute distance for each point on a profile.

We claim:

1. A method of determining a three-dimensional surface profile of an object, comprising the steps of:
   (a) directing at said object an incident beam of light having a sinusoidally varying intensity pattern;
   (b) modulating the phase of the sinusoidal intensity pattern of said incident beam;
   (c) receiving and storing a deformed grating image of a line profile of the object surface for a number of different modulated phases of said incident beam;
   (d) determining, for points on the line profile of the object surface, the distance of each such object point from a reference line, each said distance determination including the step of combining intensity values of the received image at the different modulated phases; and
   (e) rotating the object by an angular increment at a time, and repeating steps (a) through (d) for each increment to obtain line profile distances for each such increment.

2. The method as defined by claim 1, wherein said step of receiving a deformed grating image comprises receiving said deformed grating image at a linear array of detectors, and wherein the step of combining intensity values of the received image at different modulated phases comprises combining said intensity values at individual ones of said detectors.

3. The method as defined by claim 1, wherein said step of rotating the object by an angular increment at a time and repeating steps (a) through (d) for each increment to obtain line profile distances for each such increment, comprises rotating the object through substantially 360 degrees of angular increments to obtain a complete three-dimensional profile of the object.

4. The method as defined by claim 2, wherein said step of rotating the object by an angular increment at a time and repeating steps (a) through (d) for each increment to obtain line profile distances for each such increment, comprises rotating the object through substantially 360 degrees of angular increments to obtain a complete three-dimensional profile of the object.

5. The method as defined by claim 2, wherein received image intensity values at individual detectors are combined to determine an object phase at a corresponding object point, and wherein the difference between the object phase at each such point and a reference phase at a corresponding point on said reference line is used to determine the distance of said object point from said reference line.

6. The method as defined by claim 4, wherein received image intensity values at individual detectors are combined to determine an object phase at a corresponding object point, and wherein the difference between the object phase at each such point and a reference phase at a corresponding point on said reference line is used to determine the distance of said object point from said reference line.

7. The method as defined by claim 5, wherein said reference phases are obtained by positioning a reference plane between said object and said detectors, and determining, for points on a reference line of said reference plane, detector intensity values for said different modulated phases of said incident beam, the intensity values at individual ones of said detectors being combined to obtain a reference phase for a corresponding point on the reference line.

8. The method as defined by claim 6, wherein said reference phases are obtained by positioning a reference plane between said object and said detectors, and determining, for points on a reference line of said reference plane, detector intensity values for said different modulated phases of said incident beam, the intensity values at individual ones of said detectors being combined to obtain a reference phase for a corresponding point on the reference line.

9. The method as defined by claim 5, wherein said determination of the distance of each object point from the reference line includes determining the distance between detectors at which a reference phase corresponds to an object phase.

10. The method as defined by claim 6, wherein said determination of the distance of each object point from the reference line includes determining the distance between detectors at which a reference phase corresponds to an object phase.

11. The method as defined by claim 8, wherein said determination of the distance of each object point from the reference line includes determining the distance between detectors at which a reference phase corresponds to an object phase.

12. The method as defined by claim 1, wherein said number of different modulated phases of the reference beam comprises three different phases.

13. The method as defined by claim 11, wherein said number of different modulated phases of the reference beam comprises three differentt phases.

14. The method as defined by claim 1, wherein said receiving and storing of step (c) is performed for all of the different angular increments of step (e) followed by the distance determinations of step (d).

15. The method as defined by claim 2, wherein said receiving and storing of step (c) is performed for all of the different angular increments of step (e) followed by the distance determinations of step (d).

16. The method as defined by claim 4, wherein said receiving and storing of step (c) is performed for all of the different angular increments of step (e) followed by the distance determinations of step (d).

17. The method as defined by claim 11, wherein said receiving and storing of step (c) is performed for all of the different angular increments of step (e) followed by the distance determinations of step (d).

18. The method as defined by claim 14, wherein said receiving and storing of step (c) is performed for one phase of sinusoidal intensity pattern of the incident beam for each increment, and then repeating for each of the other phases of sinusoidal intensity pattern of the incident beam.

19. The method as defined by claim 15, wherein said receiving and storing of step (c) is performed for one phase of sinusoidal intensity pattern of the incident beam for each increment, and then repeating for each of the other phases of sinusoidal intensity pattern of the incident beam.

20. The method as defined by claim 16, wherein said receiving and storing of step (c) is performed for one phase of sinusoidal intensity pattern of the incident beam for each increment, and then repeating for each of the other phases of sinusoidal intensity pattern of the incident beam.

21. The method as defined by claim 17, wherein said receiving and storing of step (c) is performed for one phase of sinusoidal intensity pattern of the incident beam for each incrementt, and then repeating for each of the other phases of sinusoidal intensity pattern of the incident beam.

22. Apparatus for determining a three-dimensional surface profile of an object, comprising:
    means for directing at said object an incident beam of light having a sinusoidally varying intensity pattern;
    means for modulating the phase of the sinusoidal intensity pattern of said incident beam;
    a detector array for receiving a deformed grating image of a line profile of the object;
    means for storing the deformed grating images received at said detector array for different modulated phases of said incident beam;
    means for implementing rotational increments of the object with respect to said incident beam and said detector array so that the detector array receives deformed grating images of different line profiles of the object; and
    means for determining, for object points on such line profiles of the surface of the object, the distance at each such object point with respect to a reference line, said means including means operative to combine the stored image intensity values at a particular detector of said detector array corresponding to a respective point of the object.

23. Apparatus as defined by claim 22, further comprising means responsive to the outputs of the detector array for storing deformed grating images of a reference line for a number of different modulated phases of said incident beam.

24. Apparatus as defined by claim 22, wherein said detector array is a linear detector array.

25. Apparatus as defined by claim 23, wherein said detector array is a linear detector array.

26. Apparatus as defined by claim 22, wherein said means for implementing rotational increments of the object comprises means for rotating the object through substantially 360 degrees of angular increments.

27. Apparatus as defined by claim 25, wherein said means for implementing rotational increments of the object comprises means for rotating the object through substantially 360 degrees of angular increments.

* * * * *